(12) United States Patent
Johnson et al.

(10) Patent No.: US 10,969,232 B1
(45) Date of Patent: Apr. 6, 2021

(54) ALIGNMENT OF STANDARD-DEFINITION AND HIGH-DEFINITION MAPS

(71) Applicant: USHR INC., Livonia, MI (US)

(72) Inventors: David Keith Johnson, Canton, MI (US); Christopher Ian MacDonald, Buellton, CA (US); Shu Yang, Canton, MI (US); Vincent Michael Howard, Northville, MI (US)

(73) Assignee: USHR INC., Livonia, MI (US)

( * ) Notice: Subject to any disclaimer, the term of this patent is extended or adjusted under 35 U.S.C. 154(b) by 0 days.

(21) Appl. No.: 16/751,828

(22) Filed: Jan. 24, 2020

Related U.S. Application Data

(63) Continuation of application No. 16/732,200, filed on Dec. 31, 2019, now abandoned.

(60) Provisional application No. 62/944,551, filed on Dec. 6, 2019.

(51) Int. Cl.
| | | |
|---|---|---|
| *G01C 21/34* | (2006.01) | |
| *G01C 21/32* | (2006.01) | |
| *G06F 16/29* | (2019.01) | |
| *G09B 29/00* | (2006.01) | |
| *G01C 21/36* | (2006.01) | |

(52) U.S. Cl.
CPC ........... *G01C 21/32* (2013.01); *G01C 21/367* (2013.01); *G06F 16/29* (2019.01); *G09B 29/003* (2013.01)

(58) Field of Classification Search
CPC ...... G01C 21/32; G01C 21/367; G01C 21/34; G01C 21/26; G01C 21/28; G01C 21/3667; G01C 21/3407; G01C 21/3415; G01C 21/3423; G01C 21/343; G01C 21/3438; G01C 21/3446; G01C 21/3453; G06F 16/29; G09B 29/003; B60W 20/12; B63B 51/00
USPC .............................................. 701/23–26, 533
See application file for complete search history.

(56) References Cited

U.S. PATENT DOCUMENTS

| | | | |
|---|---|---|---|
| 9,188,985 B1 | 11/2015 | Hobbs et al. | |
| 2005/0253738 A1* | 11/2005 | Kobayashi | G01C 21/26 340/988 |
| 2010/0305850 A1* | 12/2010 | Krumm | G01C 21/32 701/532 |
| 2016/0209846 A1 | 7/2016 | Eustice et al. | |
| 2017/0276502 A1* | 9/2017 | Fischer | G01C 21/343 |
| 2018/0107216 A1 | 4/2018 | Beaurepaire et al. | |
| 2018/0188026 A1* | 7/2018 | Zhang | G06T 17/05 |
| 2018/0188042 A1* | 7/2018 | Chen | G06T 7/11 |
| 2018/0188043 A1* | 7/2018 | Chen | G06K 9/00798 |
| 2018/0189578 A1* | 7/2018 | Yang | G06T 17/00 |
| 2018/0202814 A1* | 7/2018 | Kudrynski | G01S 17/89 |
| 2018/0252548 A1* | 9/2018 | Saito | G01C 21/3694 |
| 2019/0049259 A1* | 2/2019 | Galan-Oliveras | G01C 21/3461 |

(Continued)

*Primary Examiner* — Khoi H Tran
*Assistant Examiner* — B M M Hannan
(74) *Attorney, Agent, or Firm* — Squire Patton Boggs (US) LLP

(57) ABSTRACT

Aspects of the disclosed invention relate to alignment of standard definition (SD) maps and high definition (HD maps) which may come from different sources. Responsive to input of a destination, a route to that destination may be defined, and SD map waypoints generated from that defined route. A graph may be generated from the HD map. The waypoints may be matched with nodes and edges in the graph. One or more edges may constitute a segment in the HD map. A plurality of segments are identified to match the route.

11 Claims, 39 Drawing Sheets

(56) References Cited

U.S. PATENT DOCUMENTS

| | | |
|---|---|---|
| 2019/0120640 A1* | 4/2019 | Ho .................... G01C 21/3453 |
| 2019/0146500 A1 | 5/2019 | Yalla et al. |
| 2019/0184990 A1* | 6/2019 | Lee .................... B60W 30/143 |
| 2019/0226853 A1* | 7/2019 | Kubiak ................ G06T 3/0043 |
| 2019/0304097 A1* | 10/2019 | Eade .................... G06F 16/284 |
| 2020/0026722 A1* | 1/2020 | Eade .................... G05D 1/021 |
| 2020/0051192 A1 | 2/2020 | Didier et al. |
| 2020/0166945 A1* | 5/2020 | Kim .................... G05D 1/0231 |
| 2020/0173805 A1* | 6/2020 | Viswanathan ..... G01C 21/3617 |
| 2020/0182633 A1 | 6/2020 | Liu |
| 2020/0209370 A1* | 7/2020 | Zhang .................... G06F 16/29 |
| 2020/0238999 A1 | 7/2020 | Batts et al. |
| 2020/0240794 A1 | 7/2020 | Prasser et al. |

\* cited by examiner

ALIGNMENT OF STANDARD-DEFINITION AND HIGH-DEFINITION MAPS

CROSS-REFERENCE TO RELATED APPLICATIONS

The present application is a continuation of U.S. patent application Ser. No. 16/732,200 filed on Dec. 31, 2019, entitled "ALIGNMENT OF STANDARD DEFINITION AND HIGH DEFINITION MAPS" which claims priority under 35 U.S.C. § 119(e) to U.S. Provisional Patent Application No. 62/944,551, filed on Dec. 6, 2019, entitled "ALIGNMENT OF STANDARD DEFINITION AND HIGH DEFINITION MAPS", both of which are hereby incorporated by reference in their entirety for all purposes.

FIELD OF THE INVENTION

Aspects of the present invention relate to a method to transform a sequence of points on a route into a list of segment IDs from a High Definition (HD) map. More specifically, aspects of the present invention relate to aligning a standard definition (SD) map to an HD map.

BACKGROUND OF THE INVENTION

Autonomous driving systems rely to varying extents on data from HD maps, which can provide detailed information on critical navigational issues, to enable the autonomous driving systems to function.

Among the information that HD maps may have include the following, by way of example:

Information similar to the information found in an SD map, for example, a map based on road curves, elevation changes, and/or location coordinates. There also may be local information about road-specific speed limits.

Information to define such things as lane size and location on a road; lane type, such as regular, shoulder, passing, and/or express lanes, as well as HOV lanes and/or bike lanes. There may be information about speeds within a lane; striping or solid lines; and/or line color. In one aspect, this data may be updated, for example, as a particular road has an HOV lane added, or as paint striping for lane changes, or as one or more lanes is closed temporarily for construction, among other things.

There may be true three-dimensional information, such as information about traffic signs, walls, barriers, guardrails, or various kinds of infrastructure on or at the side of a road or lane. This kind of information enables a car to locate itself precisely on a map, enabling a continual monitoring of vehicle orientation, with correction as necessary to enable the vehicle to stay in its lane, or stop correctly at intersections, or stay in a merge lane correctly, or turn and/or maneuver accurately.

There may be real-time data, and/or information such as traffic light cycles (in some cases, depending on the route, for different times of day).

The foregoing information may be provided in one or more layers to facilitate compilation or updating of particular information.

Currently in the transportation industry, original equipment manufacturers (OEMs) and Tier-One suppliers (who supply components directly to OEMs) may receive information from a navigation/routing Standard Definition (SD) Map service that provides a sequence of points along a chosen route. In a number of instances, this sequence may be a relatively sparse set of points, defined by junctions at which the driver may be instructed to proceed in a particular direction, depending on the route the driver is following. With information at this level, OEM or Tier One suppliers then can access more detailed information from an HD map, for example, the types of detail described above, and load into memory only the parts of the HD map relevant to the current route. This approach enables a smaller memory footprint for the map, among other things. The algorithm to enable this smaller loading is dynamic, and can work with any set of points comprising a route.

Some SD navigation map makers, who also have an HD map, may maintain a lookup table with a one-to-one relationship between their SD road segments and their HD road segments. The lookup table may be static, as changes to a given road segment most likely will affect both the SD map and the HD map. Those map makers can take that approach because they have control over both ends of their SD and HD maps. However, this approach does not enable cross reference between that map maker's SD map and someone else's HD map, nor between that map maker's HD map and someone else's SD map. Connecting all of the data from an HD map correctly to data on an SD map, would be desirable, so as to enable both kinds of cross-referencing (SD to HD, and HD to SD).

SUMMARY OF THE INVENTION

Aspects of the inventive method include an algorithm to run in conjunction with a map route planning service in a vehicle navigation system (SD navigation map).

Other aspects of the inventive method enable retrieval of HD segment IDs and lanes given a sequence of points along a route. These points can be provided in any standard coordinate reference system (such as WGS 84, identified here as a non-limiting example) or via Traffic Management Channel (TMC) Codes. The algorithm will produce both road segment detail as well as lane level detail for the route. This approach can enable an autonomous vehicle system or Advanced Driver Assistance System (ADAS) to know in advance all the road and lane level information required along a given planned route.

BRIEF DESCRIPTION OF THE DRAWINGS

Aspects of the inventive method and system will become apparent in view of the following detailed description, taken with the accompanying drawings in which:

FIGS. 1C-1 to 1C-4 are lower-level flow diagrams depicting aspects of the higher-level flow diagrams of FIGS. 1A, 1B-1, and 1B-2;

FIGS. 1E-1 and 1E-2 are lower-level flow diagrams depicting aspects of the higher-level flow diagrams of FIGS. 1A, 1B-1, and 1B-2;

FIGS. 1F-1 to 1F-3 are lower-level flow diagrams depicting aspects of the higher-level flow diagrams of FIGS. 1A, 1B-1, and 1B-2;

FIG. 3 depicts nodes in an HD map;

FIG. 4 depicts waypoints in an SD map;

DETAILED DESCRIPTION

Figure 1A:
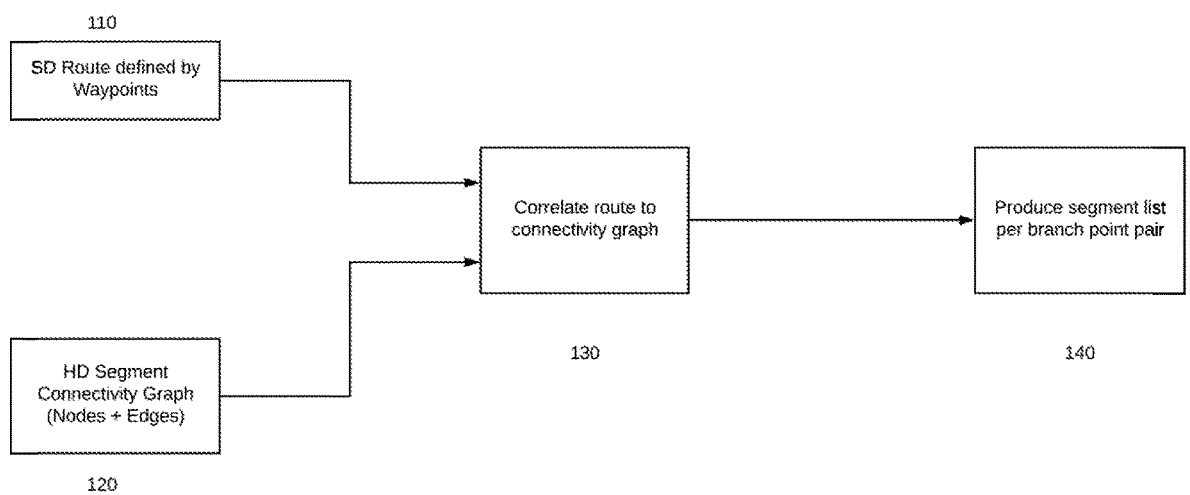
FIG. 1A is a high level flow diagram depicting aspects of the disclosed invention according to embodiments.

Aspects of the disclosed invention provide a map alignment method which may comprise:

responsive to an input of one or more destinations, defining at least one route using waypoints from a standard definition (SD) map;

generating a graph, comprising nodes and edges, from a high definition (HD) map, the graph related to at least part of the at least one route;

identifying nodes and/or edges that follow the at least one route;

converting the waypoints to nodes using the graph;

generating route segments from the defining, generating, identifying, and converting.

In one aspect, each of the just-mentioned route segments may comprise one or more edges, the route segments connecting the route nodes to define the at least one route.

In other aspects, defining at least one route may comprise defining a plurality of routes, and generating the route segments in response to selection of one of the plurality of routes as a selected route.

In one aspect, responsive to one or more changes in conditions, the at least one route may change to a changed route, or there may be a plurality of changed routes, one or more of the various actions being repeated in response to selection of the changed route or one of the changed routes, or retention of the original route.

Other aspects of the disclosed system provide a map alignment system which may comprise an SD map and an HD map, and computing equipment configured to do one or more of the following:

define at least one route using waypoints from the SD map in response to an input of one or more destinations;

generate a graph, comprising nodes and edges, from the HD map, the graph related to the at least one route;

identify nodes and/or edges that follow the route;

convert the waypoints to nodes using the graph; and generate route segments from the definition, graph generation, identification, and conversion.

In one aspect, each of the route segments wherein each route segment comprises one or more edges, the route segments connecting the route nodes to define the at least one route.

In another aspect, the computing equipment may be configured to define a plurality of routes, and to generate route segments in response to selection of one of the plurality of routes as a selected route.

In an embodiment, the system may comprise at least one data source external to the SD map and the HD map. The computing equipment may be responsive to contents of the at least one data source to change the at least one route to a changed route, or there may be a plurality of changed routes, and further configured to generate the route segments in response to selection of one of the plurality of changed routes or retention of the selected route.

In one aspect, the system may comprise a vehicle navigation system which includes the SD map and the HD map. In another aspect, the vehicle navigation may comprise the computing equipment.

In one aspect, the technique described herein applies an incremental spatial join between SD lines and their HD counterparts. In creating this spatial join, a first task is to build a common spatial network with which line segments can be matched based on road type (motorway, ramp etc.), stacking/Z order (e.g. intersections), and proximity. Aspects of the inventive technique enable grouping of line segments and join based on this network and report out unmatched records. In one aspect, output tables can be customized.

Embodiments of the invention provide lane level road information (one example of HD data) based on a sequence of route points (waypoints) from SD maps, to support electronic control units (ECUs) in vehicles. Embodiments also enable matching of any route to available information within an HD map regardless of whether the source locations are on the HD map or off the HD map.

As ordinarily skilled artisans are aware, SD maps in vehicle navigation systems comprise a great deal of data, covering substantial geographic areas. For any given route or sub part of a route, only a subset of that data may be needed at any given time. HD maps comprise a much larger amount of data, of which only a subset may be necessary at any given time. Aspects of the disclosed invention work with respect to SD data and HD data subsets to align the data in those subsets.

In addition to data in SD and HD maps in vehicle navigation systems, there may be external sources of data that can augment or update the data in the SD and HD maps. Various examples are discussed through this specification. One example is traffic message channel (TMC) location sequences, accounting for numerous possible variations along a given path, from traffic (traffic light or signal malfunction, presence of accidents, railroad crossing conditions, types of vehicles along the route), to external conditions (sporting events, concerts, or other events occurring on or near the route, or affecting the route, security alerts), to time of day (e.g. rush hour), to road construction, to other road conditions (e.g. closures, ice, sleet, fog, burst water pipes or other flooding sources) to a number of other conditions set forth in a TMC event code list, which is known to ordinarily skilled artisans, and which can change depending on decisions to add to or subtract from the list. The examples mentioned here are, indeed, merely examples, and are not intended to provide a comprehensive list. The TMC event code list provides a comprehensive list.

FIG. 1A depicts, at a high level, how SD data and HD data may be merged. Block 110, which signifies an SD route defined by waypoints, and block 120, which signifies an HD segment connectivity graph (a graph being comprised of nodes and edges), provide input to a block 130. Block 130 accepts these inputs and correlates the route to the connectivity graph. In one aspect, the nodes and waypoints may be matched (recognizing that waypoints are likely to be more sparse than nodes, given the difference in resolution between SD and HD maps). Based on the matches, in block 140, a list of segments may be generated based on edge placement as a result of the matching of the nodes and the waypoints.

Figures 1, 1B, 2:
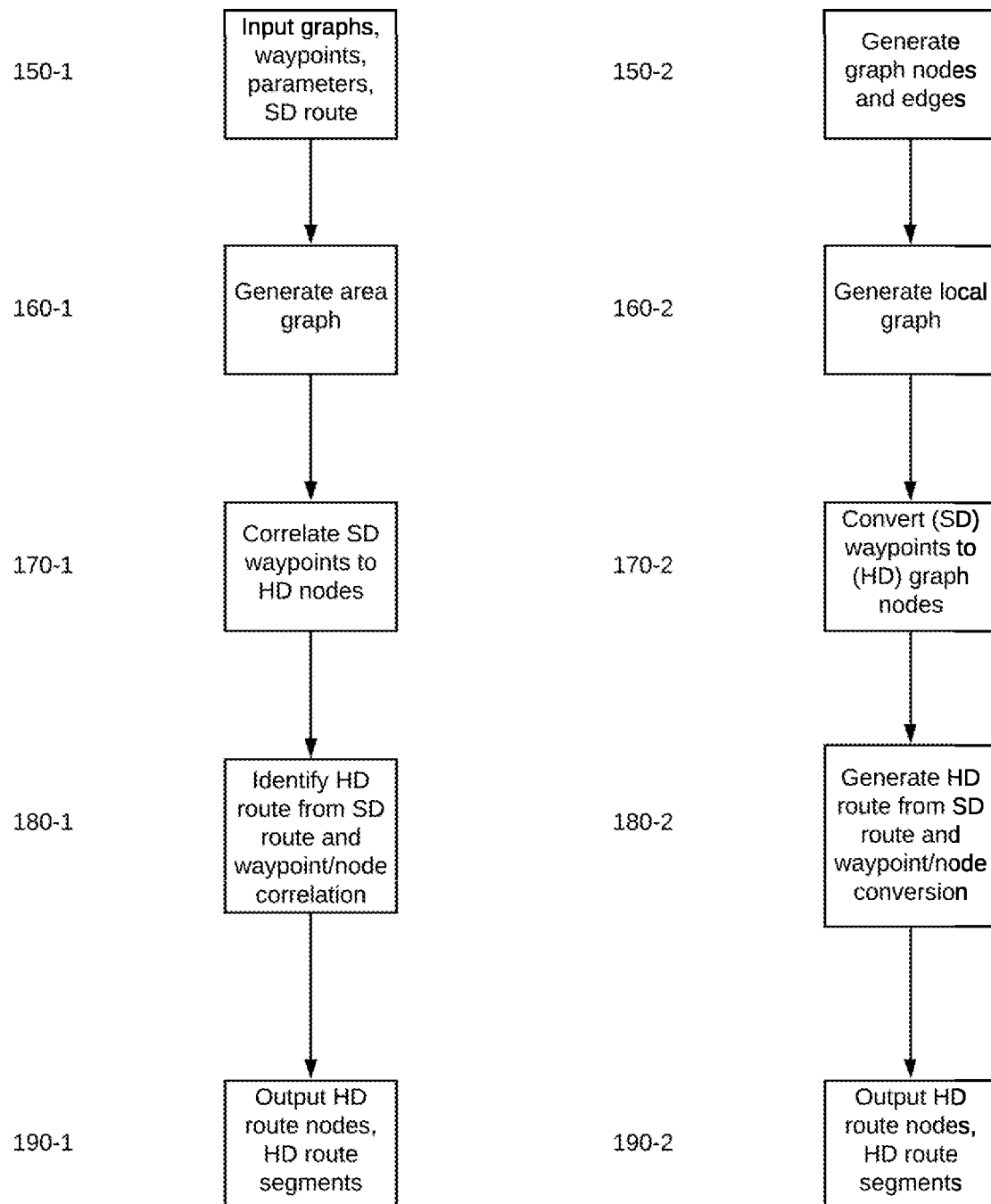
FIGS. 1B-1 and 1B-2 are high level flow diagrams depicting aspects of the disclosed invention according to embodiments.

FIG. 1B-1 is a high level flow chart depicting sequences of operation according to embodiments. At 150-1, SD and HD data are input. The SD data may comprise waypoints along a planned route. HD data may comprise graphs corresponding to various roads going from the start point to the end point along the route. At 160-1, an area graph may be generated. At 170-1, SD waypoints may be correlated to HD nodes in the area graph. In one aspect, the SD waypoints may be said to be converted to HD nodes. At 180-1, an HD route may be identified based on the SD route and the waypoint/node correlation. At 190-1, HD route nodes and route segments (a segment possibly comprising one or more edges connecting nodes, depending on the complexity of the route or the roadway) are generated.

FIG. 1B-2 is a high level flow chart depicting sequences of operation according to embodiments. At 150-2, graph nodes and edges are generated using input SD and HD data. The SD data may comprise waypoints along a planned route. HD data may comprise graphs corresponding to various roads going from the start point to the end point along the route. At 160-2, a local graph may be generated. At 170-2, SD waypoints may be converted to HD graph nodes in the local graph. At 180-2, an HD route may be generated based on the SD route and the waypoint/node conversion. At 190-2, HD route nodes and route segments (a segment possibly comprising one or more edges connecting nodes, depending on the complexity of the route or the roadway) are generated.

FIGS. 1C-1 to 1C-4 depict lower-level flow for generating graph nodes and edges in accordance with an embodiment, following one or both of aspects of elements 150-1 and 150-2 in FIGS. 1B-1 and 1B-2. Flow descriptions for FIGS. 1C-1 to 1C-4 may be understood in conjunction with one or more of FIGS. 2A-2C. As noted earlier, HD map data includes data on road segments. In one aspect, properties of these road segments may include a segment id; left and right edge points; and incident and emergent segment ids. For purposes of this discussion, an emergent segment comes out of a convergence of one or more incident segments, and a current segment (the segment corresponding to a current position along a route). A current segment may be defined by a starting node and an ending node.

Figures 1, 1C:
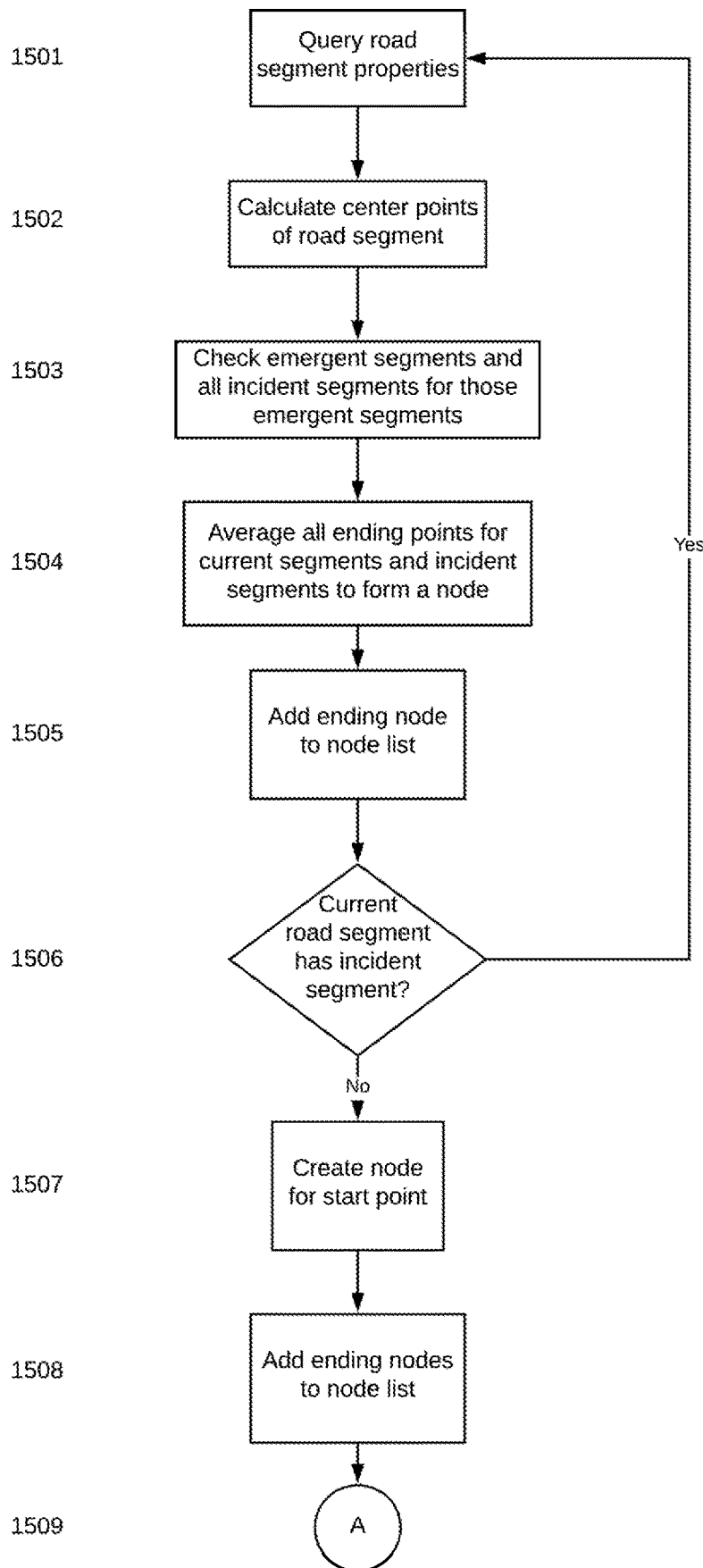
Figures 1, 1C, 2:
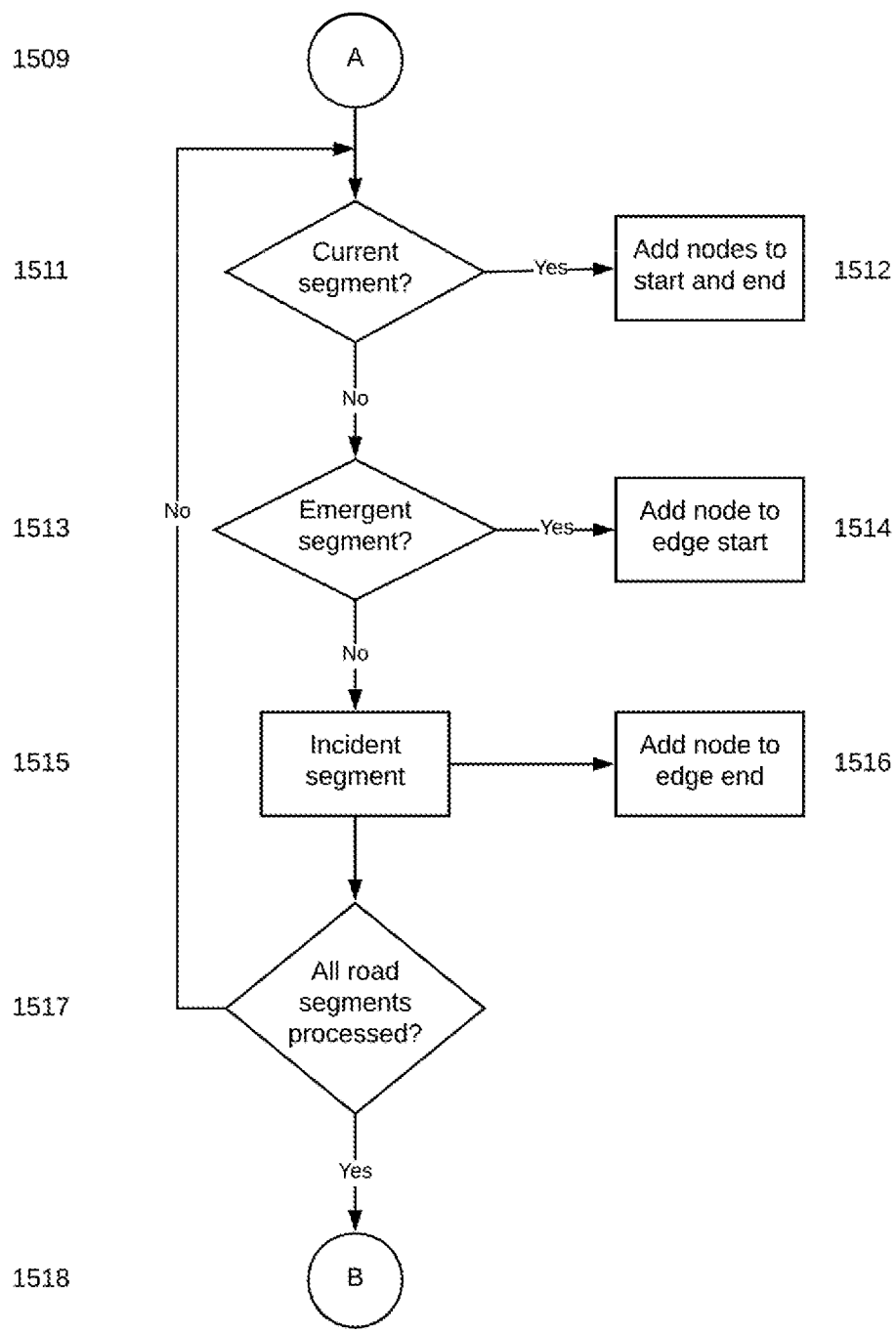

Looking first at FIG. 1C-1, at 1501 the above-mentioned road segment properties may be queried. At 1502, center points of a road segment may be calculated, for example, to provide lane positioning for a vehicle. At 1503, emergent segments and incident segments for those emergent segments may be checked, in conjunction with the current segment. Looking for example at FIG. 2A, showing a configuration 210 of a current segment 2102, an incident segment 2103, and an emergent segment 2105, a beginning node 2101 may indicate a beginning of current segment 2102.

Figure 2A:
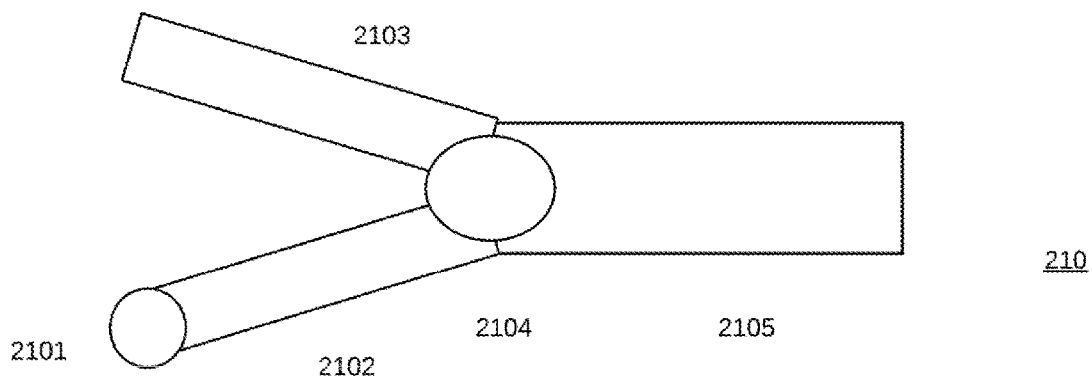
FIGS. 2A-H—are diagrams to be viewed in conjunction with one or more of FIGS. 1C-1F.

At 1504, ending points for current segments and incident segments may be averaged to form a node, for example, node 2104 in FIG. 2A, which may be termed an ending node, and which at 1505 may be added to a node list. At 1506, the flow may be recursive if there is an incident segment for the current road segment. Otherwise, at 1507, node 2101 is created as a beginning node for a start point. At 1508, ending nodes get added to a node list. At 1509, flow passes to FIG. 1C-2.

Turning now to FIG. 1C-2, at 1511, 1513, and 1515, for each road segment, a determination is made as to whether that segment is a current segment (1511), an emergent segment (1513), or an incident segment (1515). If a segment is a current segment, then at 1512 nodes are added to the start and the end of the segment accordingly. If the segment is an emergent segment, then at 1514 the node is added to the edge start. If the segment is an incident segment, then at 1516 the node is added to the edge end. At 1517, flow returns to process the next segment until all segments are processed. Depending on how the system is configured, flow may return to 1511, as FIG. 1C-2 indicates. Alternatively, and in some instances more likely, flow will return to 1501 in FIG. 1C-1 to address the next current segment. Once all segments are processed—in an embodiment, the segments all have a constant number of lanes—flow proceeds through 1518 to FIG. 1C-3.

FIG. 1C-3 addresses an approach to save storage space by removing co-linear points. This approach may be referred to as removal of nodes by line fitting. In this aspect, it may be that each segment has N points queried. If any points are co-linear, they do not need to be retained. In one aspect, co-linearity may be determined with respect to a configurable threshold number. That threshold may be less than the width of a lane. Lane widths can vary, but an example of lane width is 3.65 meters. With such a lane width, the threshold may be one or two meters.

Figures 1, 1C, 2, 3:
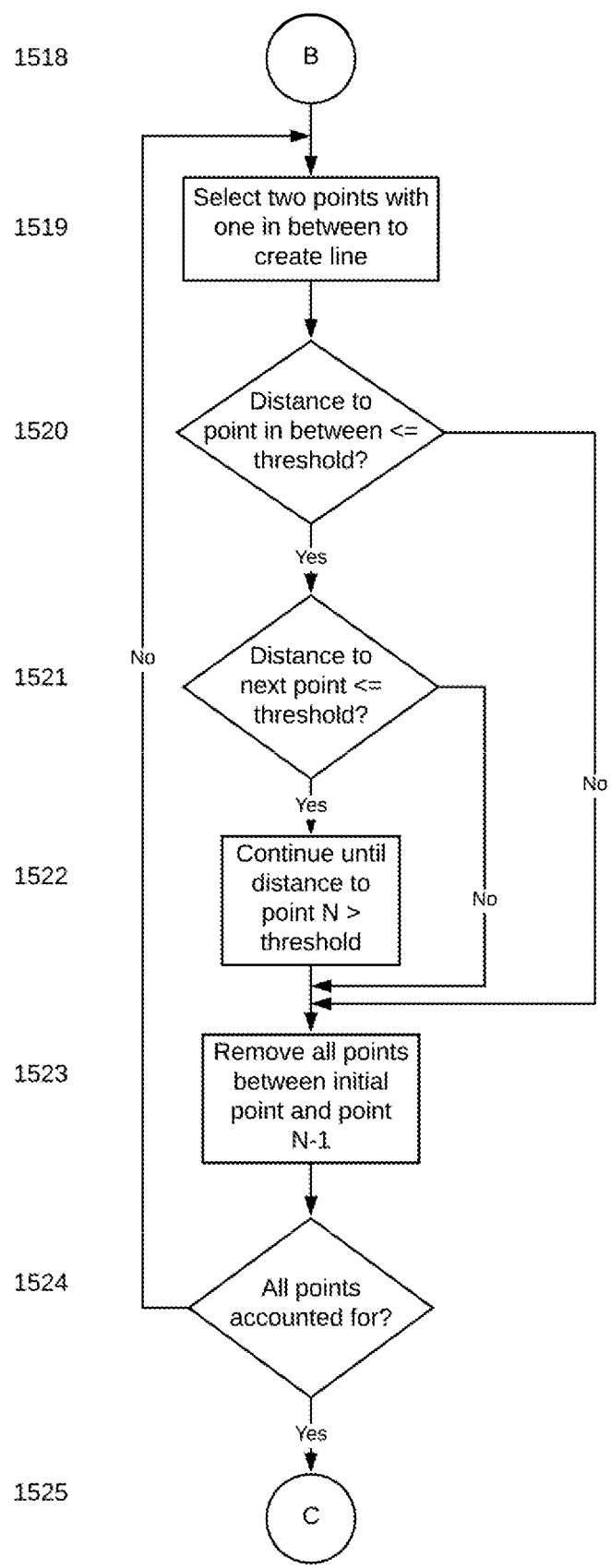
Figures 1, 1C, 2, 3, 4:
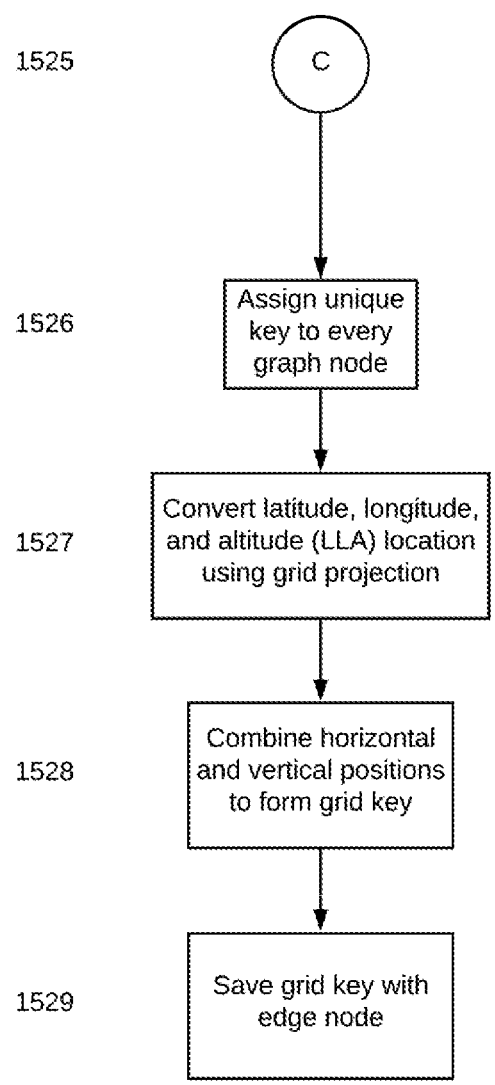
Figure 2B:
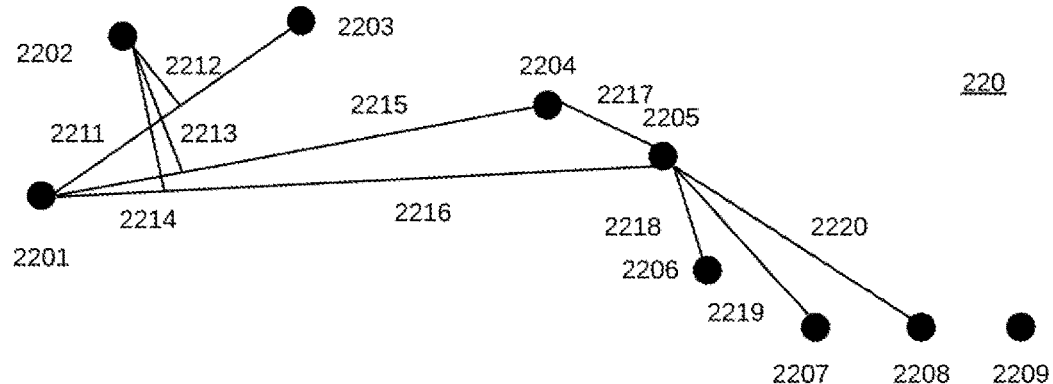

In FIG. 1C-3, at 1519 two points may be selected, with a point in between, to create a line. In FIG. 2B, these would be points 2201 and 2203, connected by line 2211, with point 2202 in between. A distance 2212 of point 2202 from line 2211 is less than a threshold. This determination would correspond to 1520 in FIG. 1C-3. A line 2215 then would get drawn between points 2201 and 2204. A distance 2213 of point 2202 from line 2215 also may be less than a threshold. This determination would correspond to 1521 in FIG. 1C-3. Next, a line 2216 gets drawn between points 2201 and 2205. Now, a distance 2214 of point 2202 from line 2216 exceeds a threshold. This would correspond to 1522 in FIG. 1C-3. It will be appreciated that 1520-1522 relate to each other in that the point selection continues until the distance exceeds the threshold. A "no" for either 1520 or 1521 would cause flow to go to 1523, as shown. At 1523, all points between the initial point (here, 2201) and point N−1 (here, point 2204) would be eliminated. This means that points 2202 and 2203 in FIG. 2B would be eliminated. This process would be repeated recursively at 1524 until all points are accounted for. At that point, flow would continue at 1525 to FIG. 1C-4.

Figure 2C:
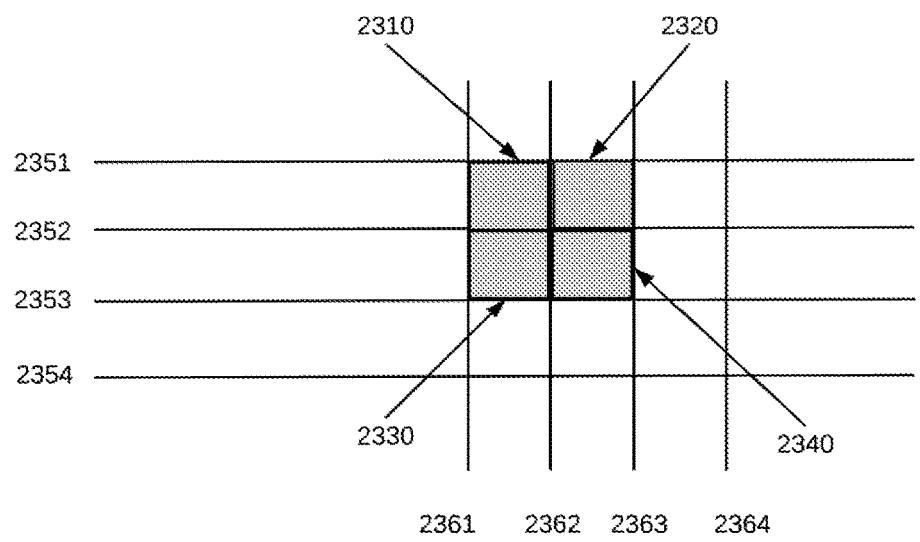

FIG. 1C-4, in conjunction with FIG. 2C, relates to formation of a grid key. Looking at FIG. 1C-4, at 1526 a unique key may be assigned to every graph node. This approach may accelerate node localization in the course of generating the local graph. One way of looking at node localization, in the context of focusing only on local data to reduce the need for storage space and computing power, would be to consider that, for example, knowing that the vehicle is in one location (e.g. Detroit) would mean that having data for another location (for example, Toledo or Grand Rapids) would not be necessary. Localization then may focus on a grid in Detroit (in this example). At 1527, a grid projection, such as a Mercator grid projection, may be used to convert a latitude, longitude, and altitude (LLA) projection. There are various known projections, with varying degrees of distortion depending on latitude and longitude. There may be an acceptable amount of distortion for localization purposes, meaning that a projection such as the Mercator projection is acceptable. Other projections may provide more accurate results in different latitudes and longitudes, and so desirably may be substituted, subject to ability to resolve computational issues which may arise. Non-limiting examples of such projections may include Transverse Mercator projection; a Lambert Conformal Conic projection, a Robinson projection, and a stereographic projection.

Returning to FIG. 1C-4, at 1528 horizontal and vertical positions may be combined to form a grid key. FIG. 2C shows grids 2310, 2320, 2330, and 2340 among longitudinal lines 2351-2354 and longitudinal lines 2361-2364. As an example, a grid key may be an index number, in which an X coordinate is in one grid (e.g. 3), and a Y coordinate is in another grid (e.g. 5). The grid key as an ordered (X, Y) pair would be (3, 5).

Figure 1D:
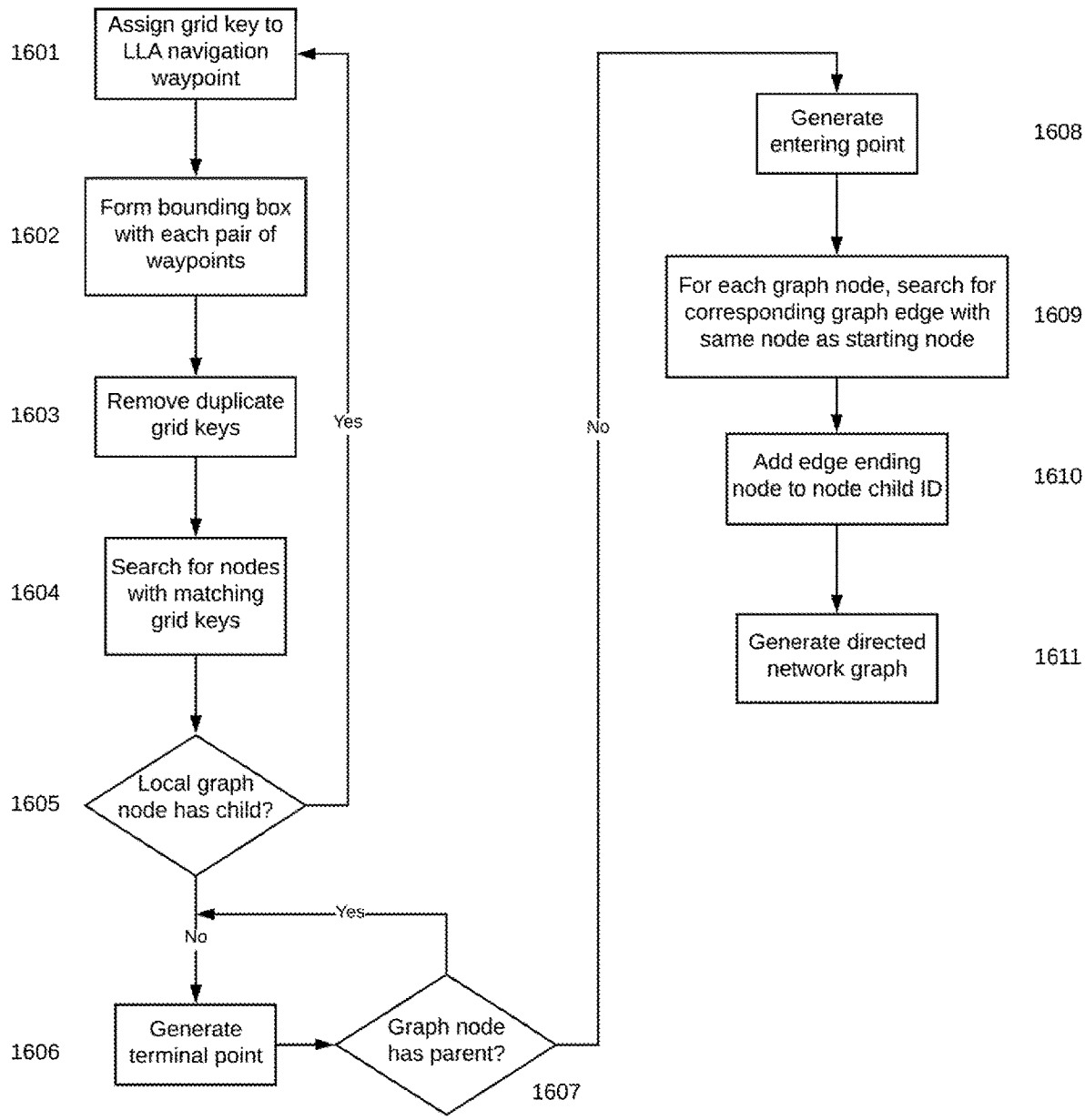
FIG. 1D is a lower-level flow diagram depicting aspects of the higher-level flow diagrams of FIGS. 1A, 1B-1, and 1B-2.
Figure 2D:
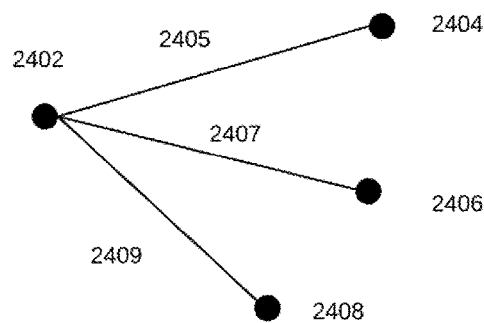

FIG. 1D depicts lower-level flow for generating graph nodes and edges in accordance with an embodiment, following one or both of aspects of elements 160-1 and 160-2 in FIGS. 1B-1 and 1B-2. Flow description for FIG. 1D may be understood in conjunction with FIG. 2D. In evaluating this flow, it may be considered that using only local nodes and local edges can reduce the search time to generate a route. This approach is consistent with, for example, focusing on grids in Detroit when in Detroit, rather than looking at grids in Toledo or Grand Rapids. The local area may be determined by an LLA navigation waypoint, which would be assigned a grid key using a grid projection, as discussed earlier. This assignment is shown as 1601 in FIG. 1D.

At 1602, a bounding box may be formed with each pair of waypoints. All grid keys within this bounding box may be conserved in a list. At 1603, duplicate grid keys may be removed from the list before searching for nodes with matching grid keys at 1604. Local edges may be found by node to the corresponding edge.

At 1605, a determination is made whether a local graph node has a child. It should be remembered that in any pair of nodes in this situation, there will be one parent and one child. If there is no parent node, then it may be determined that the node is at the beginning. If there is no child node, then it may be determined that the node is at the end. In this context, it may be considered that there may be SD map data for a road, for example, a dirt or gravel (unpaved) road, but there may not be HD data. The road may be too small for reliable HD data (e.g. single narrow lane, too small to determine center point, or the like). There may be old paint on the road, making lanes difficult to determine. In these kinds of circumstances, with an absence of HD data, an autonomous driving system has to inform the driver that the driver needs to take over operation of the vehicle. Hence, at 1606, if there is no child node, a terminal point may be generated. At 1607, if the graph node has no parent, at 1608 an entering point may be generated. This may be a point at which a vehicle can enter the map, for example, at an on ramp. These are the kinds of points that can be generated by searching graph nodes that have no parents.

Directivity from parent nodes to child nodes may be part of what is termed a directed network graph, which gives a graph network connectivity. In this circumstance, for example, at 1609 for each graph node, there may be a search for a corresponding graph edge with the same node as the starting node. Looking for example at FIG. 2D, edges 2405, 2407, and 2409 may have the same parent node 2402, and respective child nodes 2404, 2406, and 2408. Returning to FIG. 1D, at 1610 an edge ending node may be added to a node child ID, and at 1611, a directed network graph may be generated.

Figures 1, 1E:
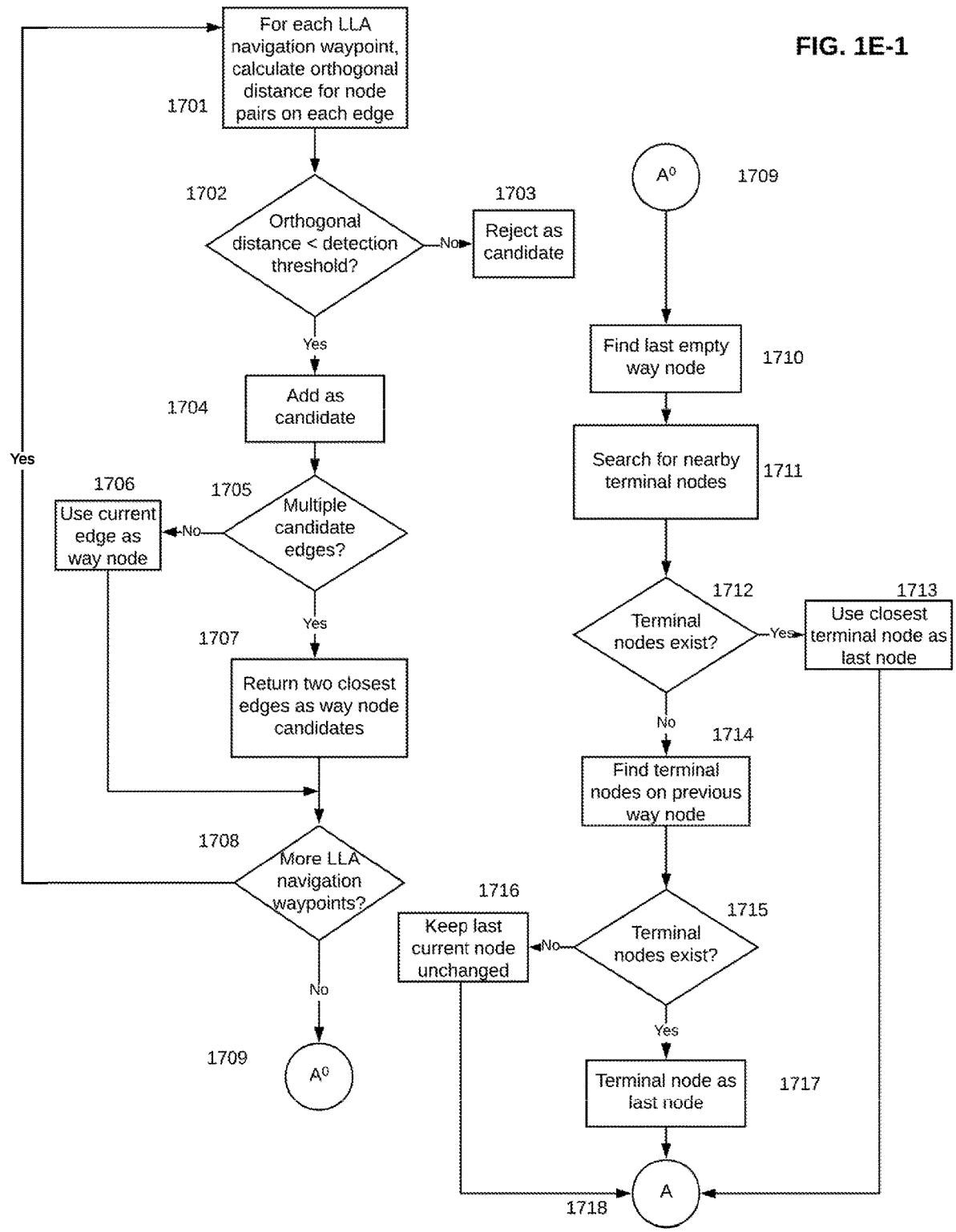
Figures 1, 1E, 2:
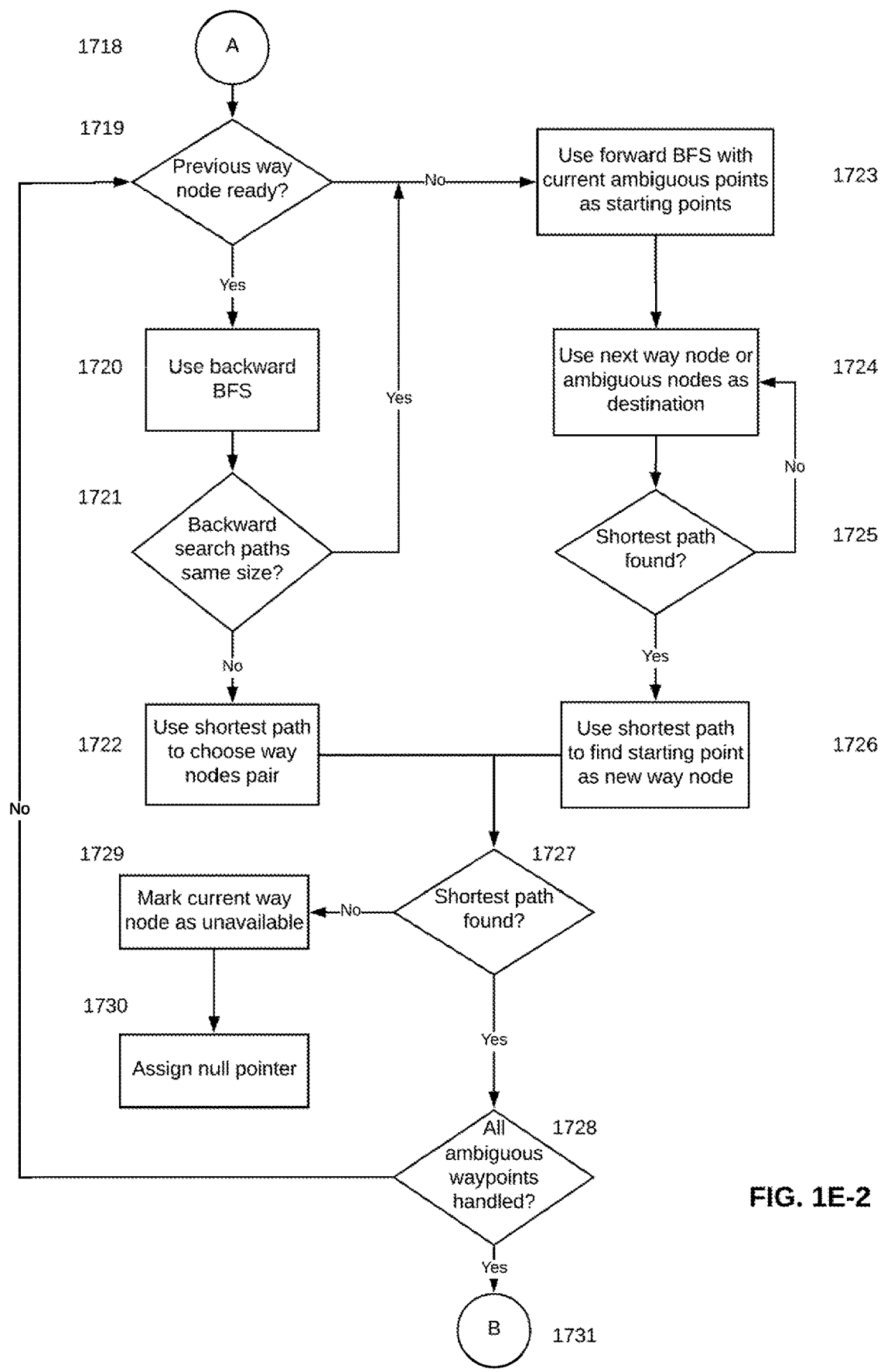

FIGS. 1E-1 and 1E-2 depict lower-level flow for converting SD waypoints to HD graph nodes in accordance with an embodiment, following one or both of aspects of elements 170-1 and 170-2 in FIGS. 1B-1 and 1B-2. Flow descriptions for FIGS. 1E-1 and 1E-2 may be understood in conjunction with one or more of FIGS. 2E-2G.

Figure 2E:
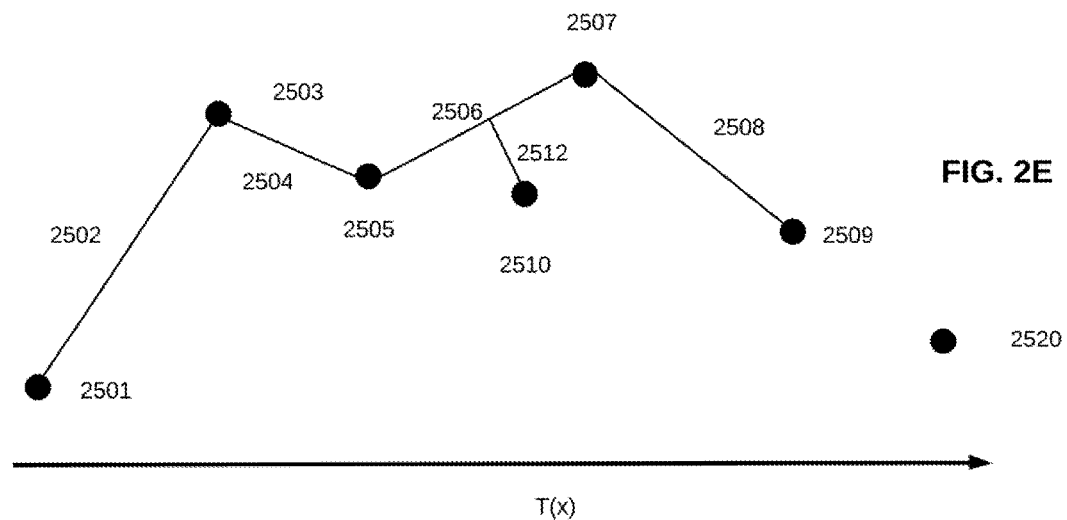

Looking at FIG. 1E-1, at 1701, for each LLA navigation waypoint, an orthogonal distance is calculated for node pairs on each edge. At 1702, if the orthogonal distance is greater than a detection threshold, at 1703 the waypoint is rejected as a candidate. If the orthogonal distance is less than or equal to a threshold, at 1704 the waypoint may be added as a candidate. In this connection, FIG. 2E depicts a plurality of node pairs 2501,2503; 2503,2505; 2505,2507; and 2507, 2509, defining a respective plurality of road segments 2502, 2504, 2506, and 2508, with some of the road segments in proximity to an LLA navigational waypoint 2510. Another LLA navigational waypoint 2520 is away from the edge. As discussed with reference to FIGS. 1E-1 and 1E-2, for each such waypoint, an orthogonal distance may be calculated. Any such orthogonal distance that is less than the detection threshold may be added as a candidate, and one that is greater than the threshold may be rejected. Accordingly, waypoint 2510 may be added, and 2520 may be rejected.

Returning to FIG. 1E-1, at 1705 if there are not candidate edges, then at 1706 the current edge should be used as a way node. If there are multiple candidate edges, then at 1707 the two closest edges may be returned as way node candidates. A way node may be understood as the current edge, as represented by its first and last node. From either 1706 or 1707, flow goes to 1708. If there are more LLA navigation waypoints, then flow returns to 1701. Otherwise flow proceeds to 1709.

It is the case that some LLA navigation waypoints near road entrances or exits could be outside the HD map. One such example of waypoints would be on and off ramps.

Figure 2F:
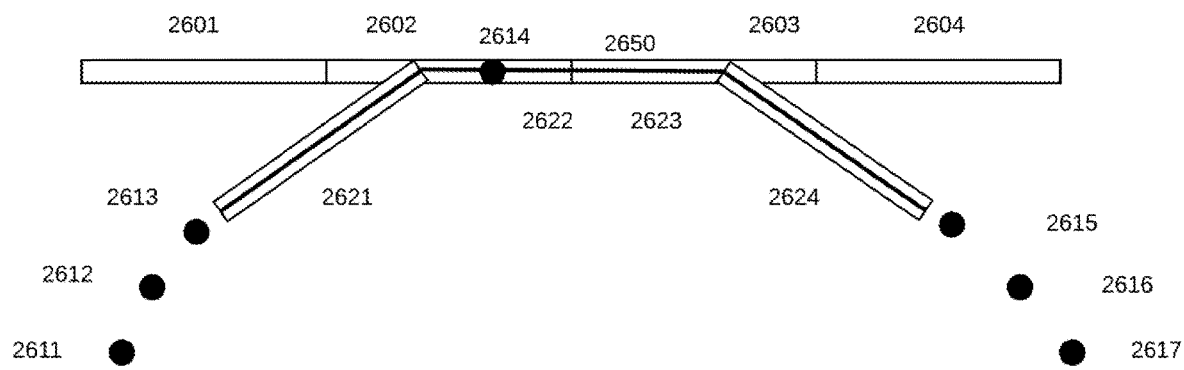

An example of the foregoing may be understood in connection with FIG. 2F, which shows on and off ramps. FIG. 2F depicts a plurality of road segments 2601-2604 on a highway, with an entrance ramp 2621 and an exit ramp 2624 and intervening segments 2622 and 2623. LLA navigation waypoints 2611-2613 lead to the entrance ramp 2621. LLA navigation waypoint 2614 is on HD route 2650 that extends from the entrance ramp to the exit ramp. LLA navigation waypoints 2615-2617 lead from exit ramp 2624. The LLA navigation waypoints 2611-2613 and 2615-2617 are away from the HD route 2650.

Returning to FIG. 1E-1, at 1710, looking for example at off ramps, the last empty way node is found, and at 1711, a search is conducted for nearby terminal nodes. At 1712, if terminal nodes exist, at 1713 the closest terminal node is used as the last node, and flow proceeds to 1718 in FIG. 1E-2. If terminal nodes do not exist, at 1714, terminal nodes on a previous way node are found. At 1715, if terminal nodes exist, then at 1717 a terminal node is set as the last node, and flow continues at 1718 to FIG. 1E-2. Otherwise, at 1716 the last current node is kept unchanged and flow continues to 1718. A similar process may be conducted for finding on ramps. First there is a search for the first empty way node, and then there is a search for starting nodes.

In FIG. 1E-2, there is a flow for waypoint filtering using waypoint routing. By way of background, once waypoints are converted to way nodes, decisions may not be possible simply by looking at geometric distance. For example, it could be that one waypoint could have several way node candidates. These candidates may be filtered further by means of a waypoint filter.

Figure 2G:
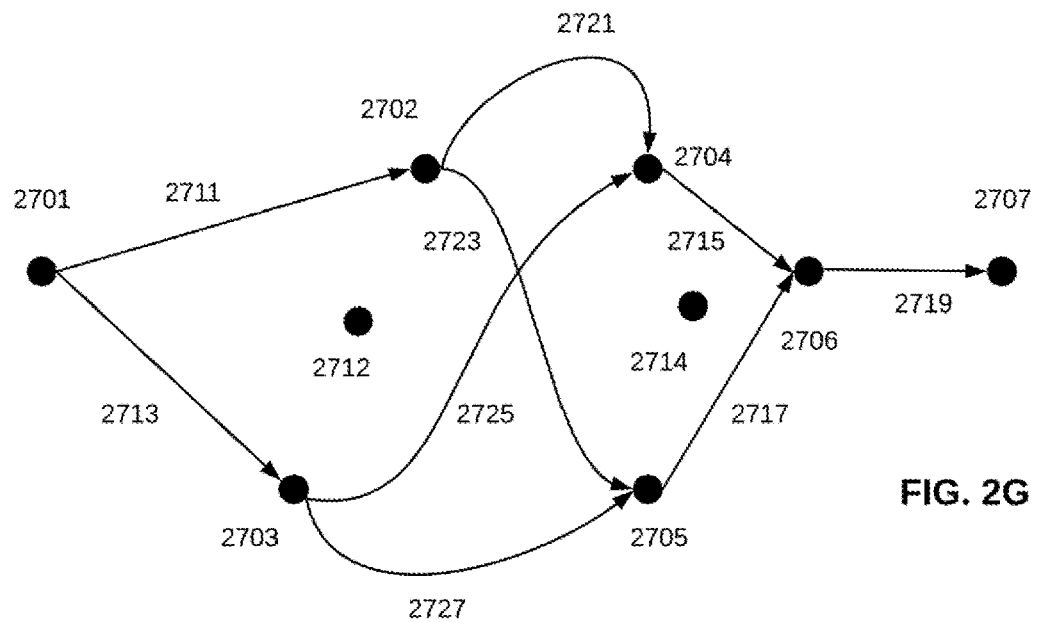

FIG. 2G is a diagram depicting paths from a starting node 2701 to an ending node 2707, addressing a situation in which waypoints 2712, 2714 between the starting node 2701 and the ending node 2707 yield one or more ambiguous nodes 2702-2705 which create multiple alternative paths, as follows:

2711-2721-2715-2719
2711-2723-2717-2719
2713-2727-2717-2719
2713-2725-2715-2719

Segments 2711 and 2713 may come from a backward search, and segments 2721, 2723, 2725, and 2727 may come from a forward search. In these circumstances, it may be the case that there are multiple tiers of road. Non-limiting examples may include roads at different elevations, roads with local and express lanes, or main roads with parallel service roads with multiple entry points. A route developed from waypoints from an SD map may show a path along one of these possible routes, but when the HD map is consulted, for example, to plot a route for autonomous driving, there may be several different possibilities given the road conditions. The nodes may be ambiguous because there are multiple ways to get from the node on the left to the node on the far right. The ambiguous nodes 2702-2705 may not be coincident with waypoints 2712, 2714 which come from the SD map.

Looking at FIG. 1E-2, at 1719 it is determined whether a previous way node is ready. If so, then at 1720 a backward breadth first search (BFS) may be used. At 1721, it is determined whether the backward search paths have the same size. If not, then at 1722, the shortest path to choose a way nodes pair is used.

If a previous way node is not ready, then at 1723 a forward BFS search may be used. Alternatively, if the backward search paths are the same size, then again at 1723 a forward BFS search may used. In either case, current ambiguous points will be used as starting points. At 1724, the next way node, or ambiguous nodes may be used as the destination. And again, the shortest path is being searched for, so that at 1725, the search continues until that path is found. Then, at 1726, the shortest path will be selected to find the starting point as the new way node.

Whether coming from the backward BFS branch or from the forward BFS branch, at 1727 it is determined whether a shortest path has been found. If not, then at 1729 the way node is marked as unavailable, and at 1730, a null pointer is assigned. If a shortest path is found, then at 1728 it is determined whether all ambiguous waypoints have been handled. If not, flow returns to 1719. If so, flow continues at 1731 to FIG. 1F-1.

In the just-described situation, as an alternative to BFS, a depth first search (DFS) could be employed. However, in situations where going from node to node is preferred, BFS is likely to yield better results. For example, in highway situations, DFS could work because there may be multiple segments between exits, so looking farther away from the current node might be satisfactory. This also might be the case for an express lane which bypasses some exits. But in urban situations, even in urban freeway situations in which exits may be close together, BFS may work better.

FIGS. 1F-1 to 1F-3 depict high-level flow for generating an HD route from an SD route and the waypoint/node conversion of FIGS. 1E-1 and 1E-2, in accordance with an embodiment, following one or both of aspects of elements 180-1 and 180-2 in FIGS. 1B-1 and 1B-2. There are five main processes: Generation of a search path; search performance; route path retrieval; conversion of path nodes to path segments; and handling of broken routes.

At 1801, a search for a next waypoint may be conducted. In one embodiment, the search technique is BFS, but as discussed previously, in some circumstances a DFS search may be more appropriate. The search is conducted recursively at 1801 until a path is found. At 1803, the next waypoint may be used to search the path. If there is a path from that point to the next two waypoints, flow continues at 1807 to FIG. 1F-2. Otherwise, at 1805 the path is defined as unreachable, or broken. In that circumstance, at 1806, if all the waypoints are not yet handled, the search resumes with the next waypoint. Otherwise flow will proceed at 1807 to FIG. 1F-2.

Figures 1, 1F:
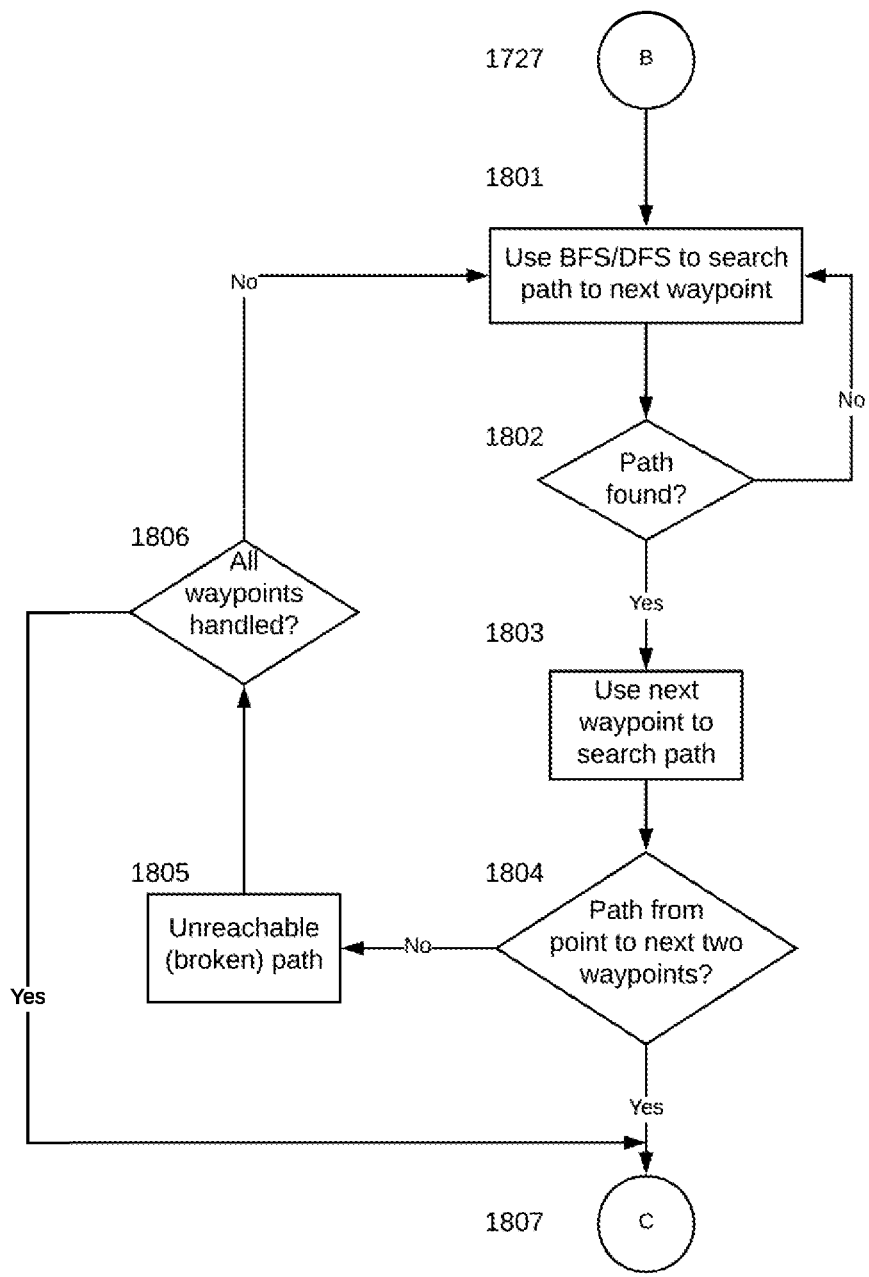
Figures 1, 1F, 2:
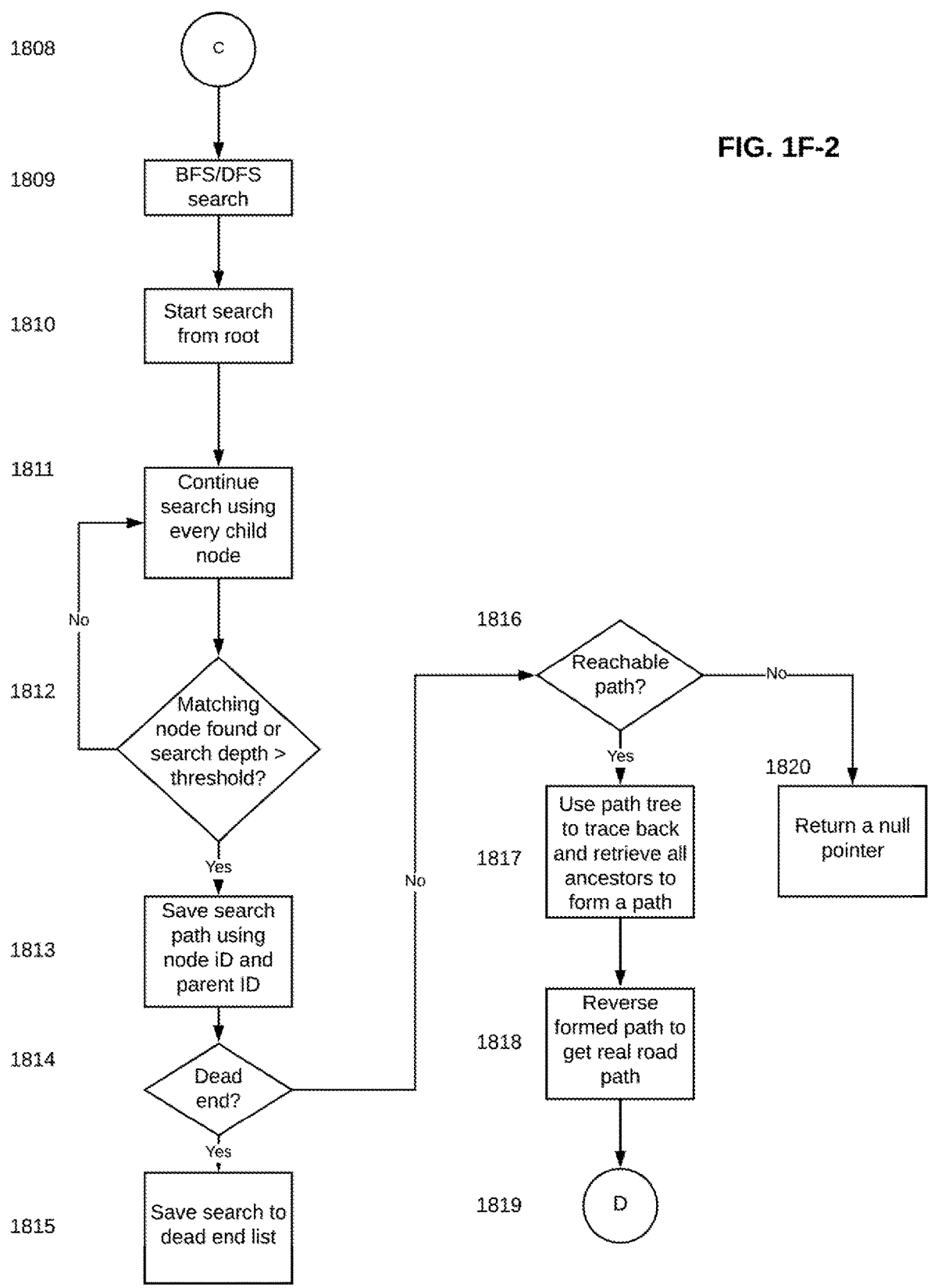
Figures 1, 1F, 2, 3:
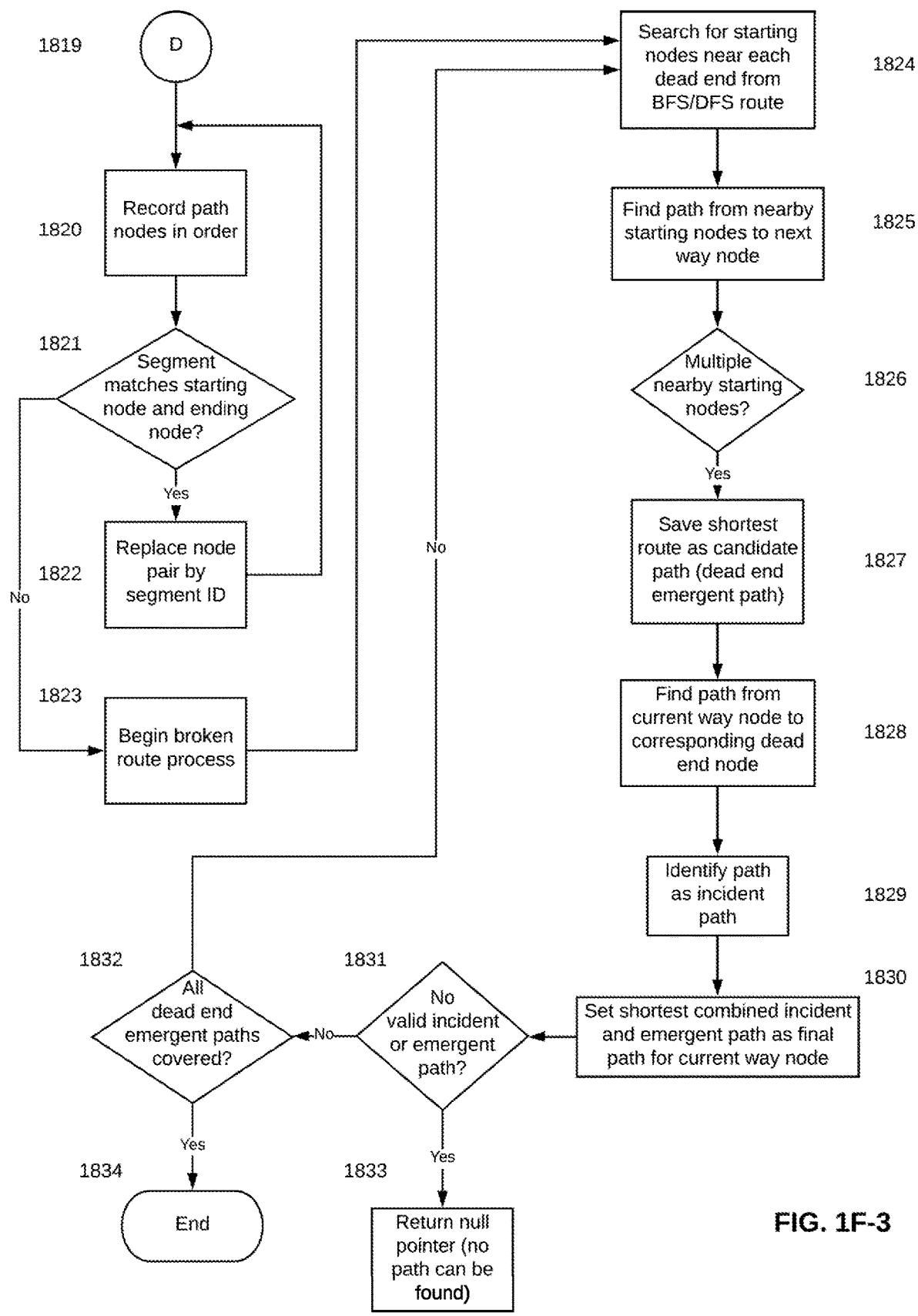

In FIG. 1F-2, at 1809 a search (in one embodiment, a BFS search, though other techniques may be suitable in some circumstances) is initiated, starting from the root at 1810 and continuing at 1811 through every child node until, at 1812, either a matching node is found, or the search depth is determined to be bigger than a threshold. Here, in one aspect, search depth is the number of segments necessary to pass through to get to a target. If the number of segments exceeds a threshold, a route may be determined to be a bad route.

Once a matching node is found or the search depth is determined to be bigger than a threshold, at 1813 the search path is saved using the node ID and the parent ID. At 1814, it may be determined whether a dead end (i.e. a node with no child node) has been reached. If that happens, at 1815, the search may be saved to a dead end list. For example, the path may lead to a toll booth, as will be described later. At that point, there may be no path (continuity is broken; there may be no HD map data at the toll booth). In one aspect, this may be a situation that can be remedied later on, when there is HD map data available; hence the desirability, in an embodiment, to save the search to a dead end list.

If there is no dead end, at 1816 it is determined whether the path is reachable. If it is not, then at 1820 a null pointer may be returned, an indication from an autonomous driving system that the driver should take over because there is no path to follow. If the path is reachable, then at 1817 a path tree may be used to trace back and retrieve all ancestor points to form the path. Then, at 1818, the formed path may be reversed to obtain a real road path. At this point, at 1819 flow would pass to FIG. 1F-3, which describes flow for converting path nodes to path segments.

Looking at FIG. 1F-3, at 1820 path nodes are recorded in order. Since nodes do not exist on an HD map but are created from an HD map, the nodes need to be converted to an HD segment ID sequence. This conversion is exemplified at 1821 and 1822. If an HD segment matches a starting node and ending node, the starting/ending node pair may be replaced by a segment ID. Flow recirculates through the various recorded path nodes, until there is not a segment matching the starting and ending node. At that point, flow may go from 1821 to enter a broken route process, beginning at 1823.

Figure 2H:
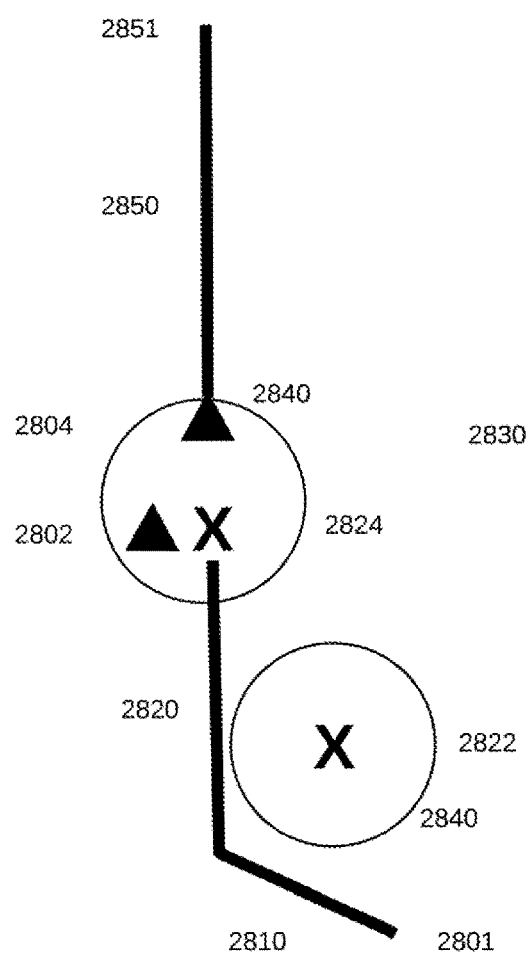
Figure 3:
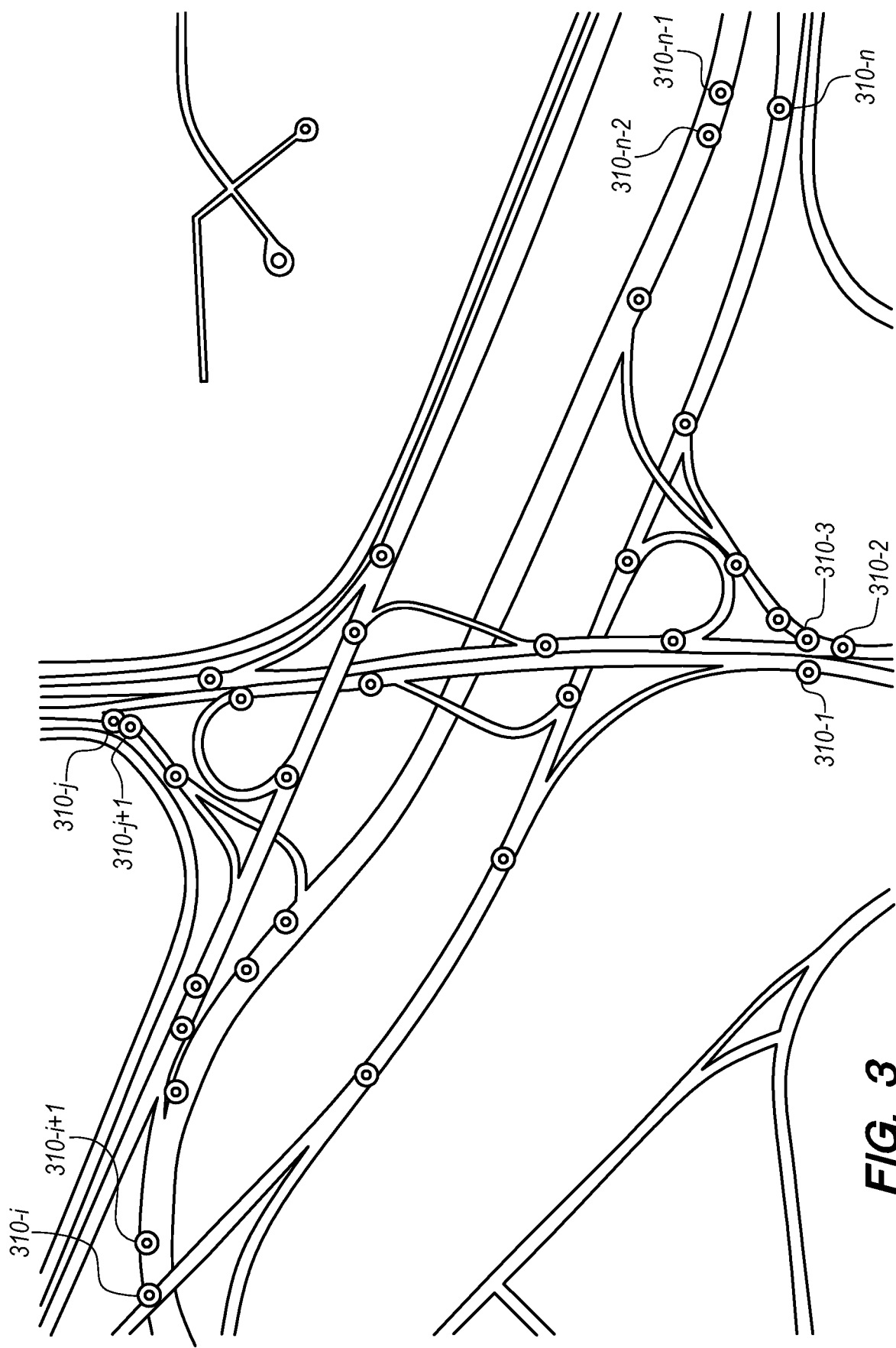
Figure 4:
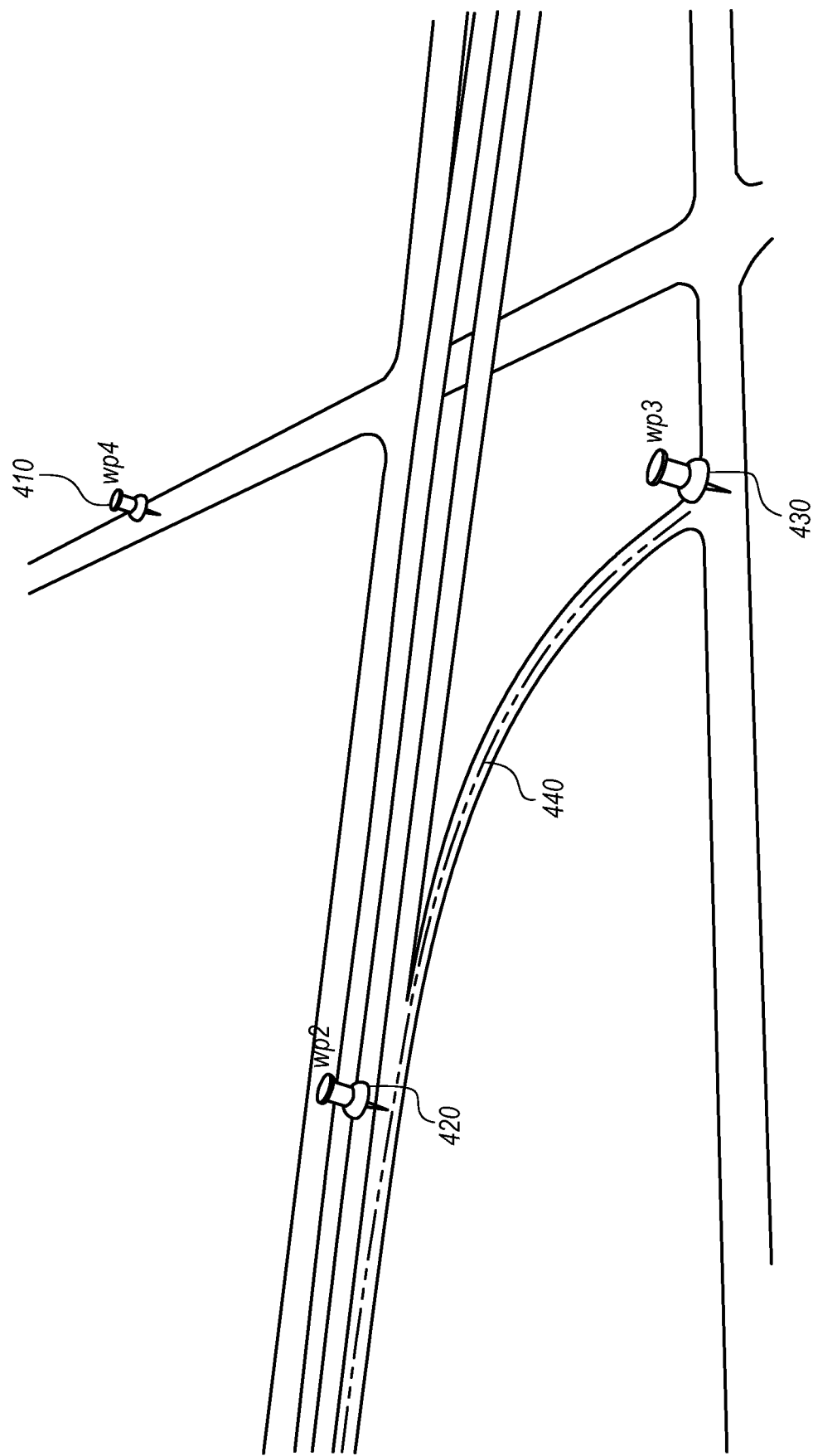

At 1824, there may be a search for starting nodes near each dead as determined from a BFS or DFS route. At 1825, a path is found from nearby starting nodes to the next way node. This is shown diagrammatically at FIG. 2H, as will be discussed below. At 1826, if there are multiple nearby starting nodes, as FIG. 2H shows, at 1827 the shortest route may be saved as a candidate path (this may be a dead end emergent path). At 1828 a path is found from the current way node to a corresponding dead end node. At 1829, the path is identified as an incident path. At 1830, the final path for the current way node is set to be the shortest combined incident and emergent path. However, at 1831, if there is no valid incident or emergent path, then at 1833 a null pointer is returned, indicating that no path can be found. Otherwise, if there is a valid incident or emergent path, at 1832 it is determined whether all of the dead end emergent paths have been covered. If so, flow ends at 1834. Otherwise, floe returns to 1824.

The returning of a null pointer at 1832 in FIG. 1F-3 may be understood with reference to FIG. 2H, which is a diagram depicting a broken path. In a broken path, the SD route may be continuous, but the HD route may not be. For example, a toll plaza may be a waypoint on an SD map. However, there may be no HD segment between some point before the toll booth and some point after the toll booth. Such broken routes may be detected when a current way node has an unreachable route, and there exists a valid way node for a current and a next point. In such a circumstance, an autonomous driving system may instruct a driver to take over vehicle operation in order to traverse the toll booth area. The autonomous driving system may resume control after passing through the broken route.

Looking at FIG. 2H, way nodes 2801 and 2851 at opposite ends of an area are separated by a toll plaza area 2830. Segments 2810 and 2820 lead from way node 2801 to the toll plaza, and segment 2850 may lead from a starting point 2804 after the toll plaza. From a prior search, for example, a backward BFS, dead ends 2822 and 2824 may be identified. Dead end 2822 may be discarded in favor of segment 2820, with dead end 2824 identified as one for which there is determined to be no incident or emergent path within a search radius 2840. It would be at this point, corresponding to 1831 in FIG. 1F-3, that the autonomous system would instruct the driver to take over (returning a null pointer at 1833).

Next to dead end 2824, there may be a starting point 2802. Alternatively, there may be a starting point 2804 at the other end of the toll plaza. This would be an example of the multiple nearby starting nodes at 1826 in FIG. 1F-3. Depending on the HD route information available, the system may retake control at starting point 2804, on segment 2850, heading toward way node 2851.

The following discussion follows from foregoing discussion of the flow of operation in accordance with aspects of the invention. FIG. 3 depicts a highway interchange with a number of nodes 310-1 to 310-n marked thereon. In a graph, an edge will connect two adjacent nodes. In developing a route, a route segment may comprise one or more edges. Depending on the severity of curves, bends, or other changes in the route portion, more nodes may be provided, meaning more edges, and possibly more segments.

FIG. 4 depicts a portion of a highway interchange with waypoints 410, 420, and 430 marked thereon. A route portion or path 440 also is shown as a successful exit from the highway. The route portion 440 may comprise one or more edges, meaning two or more nodes. Waypoints 420 and 430 are along route portion 440. Waypoint 410 is well off route portion 440. Alignment between SD and HD portions then may involve the waypoints 420, 430, and the nodes defining segment(s) constituting route portion 440. Waypoint 410 would not be involved.

Figure 5:
FIG. 5 depicts mapping of a route using SD waypoints and HD nodes.

FIG. 5 shows a more detailed navigation of a highway interchange. In FIG. 5, HD nodes 510-1 to 510-n are seen along a route. FIG. 5 also shows an HD graph network 520, and a green generated route 540 using the HD nodes and the SD waypoints in the Figure. In FIG. 5, waypoints have the letter/number combination "wpx" next to them, where x is an integer. In an embodiment, each node has a four digit identifier 540-1, 540-2, . . . next to it. When edges connect nodes to define a path or route, there will be a sequence of these four digit identifiers, the sequence signifying the path or route.

A node identifier need not be an integer of any particular number of digits. According to aspects of the disclosed invention, the identifiers could be a text string, or a hash code, or an integer of a different number of digits. Also, according to an embodiment, the identifiers could be associated with edges or with segments.

Figure 6:
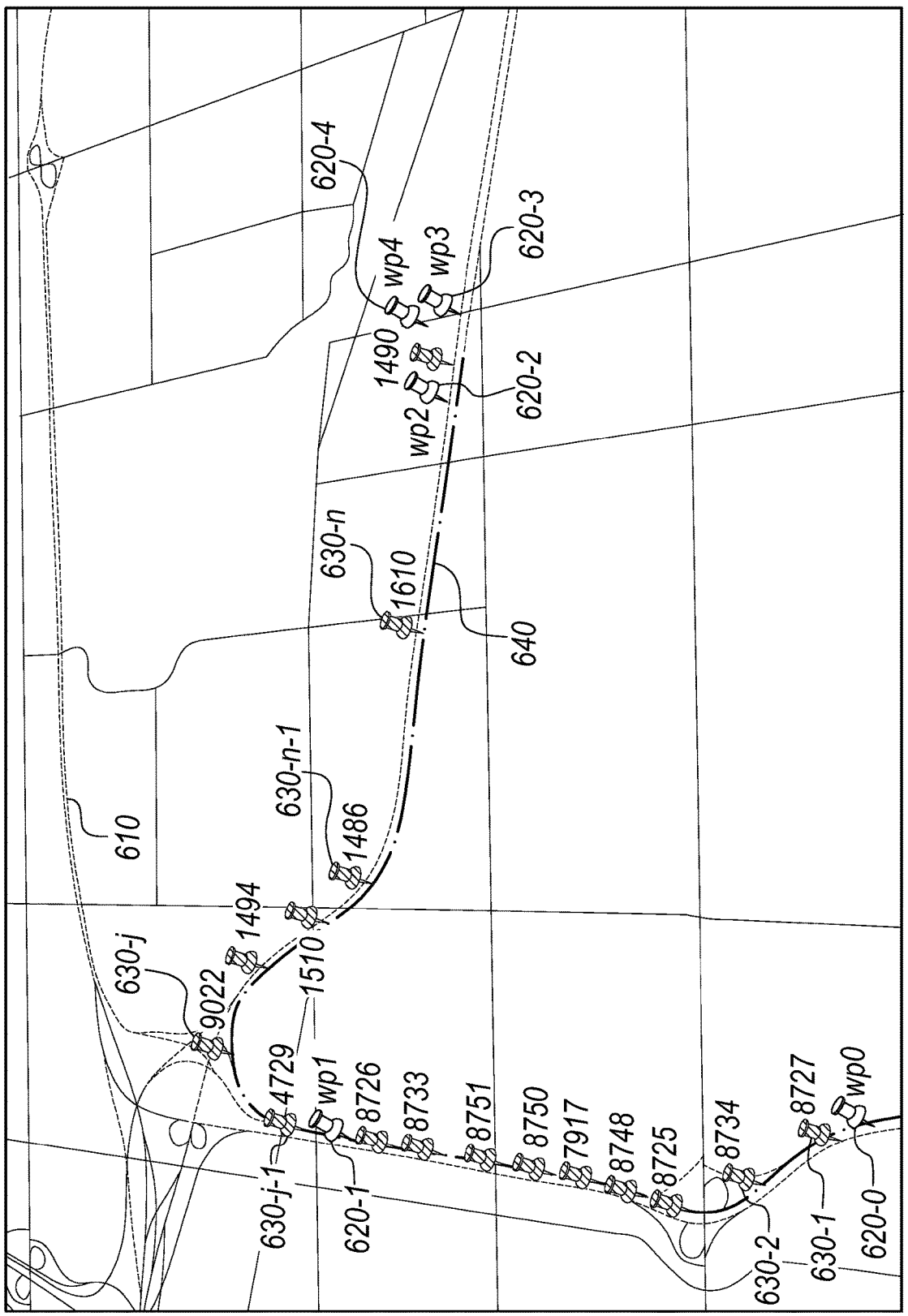
FIG. 6 depicts mapping of another route using SD waypoints and HD nodes.

FIG. 6 depicts a route in which red lines 610 signify an HD graph network. Pins 620-0 to 620-4 signify SD waypoints. Pins 630-1 to 630-n signify HD nodes. Green line 640 is a generated path using the various nodes and waypoints. It should be noted that there are several red lines in the HD graph network 610 that do not follow or track the green line 640. The waypoints 620-0 to 620-4 which help to define the route do not match those red lines, making those red lines extraneous to the route.

Figure 7:
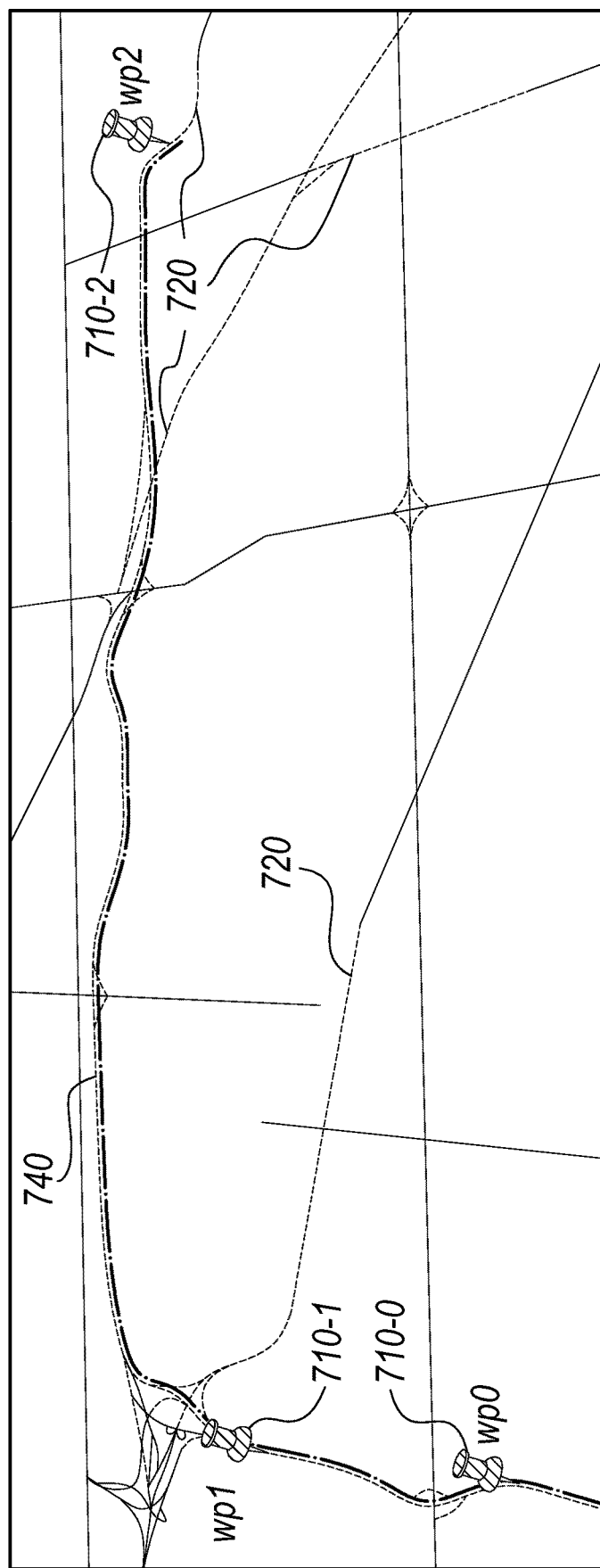
FIG. 7 depicts mapping of yet another route using SD waypoints and HD nodes.

FIG. 7 depicts another route in which pins 710-0 to 710-2 signify SD waypoints. Red lines 720 signify an HD graph network. While FIG. 7 does not show HD nodes explicitly, those nodes and their associated edges are involved in generating the HD graph network 720. Green line 730 indicates a route of segments generated using the graph (including the nodes and edges) and the SD waypoints. It should be noted that there are several red lines 720 that do not follow or track the green line 730. The waypoints 710-0 to 710-2 which help to define the route do not match those red lines, making those red lines extraneous to the route.

Figure 8A:
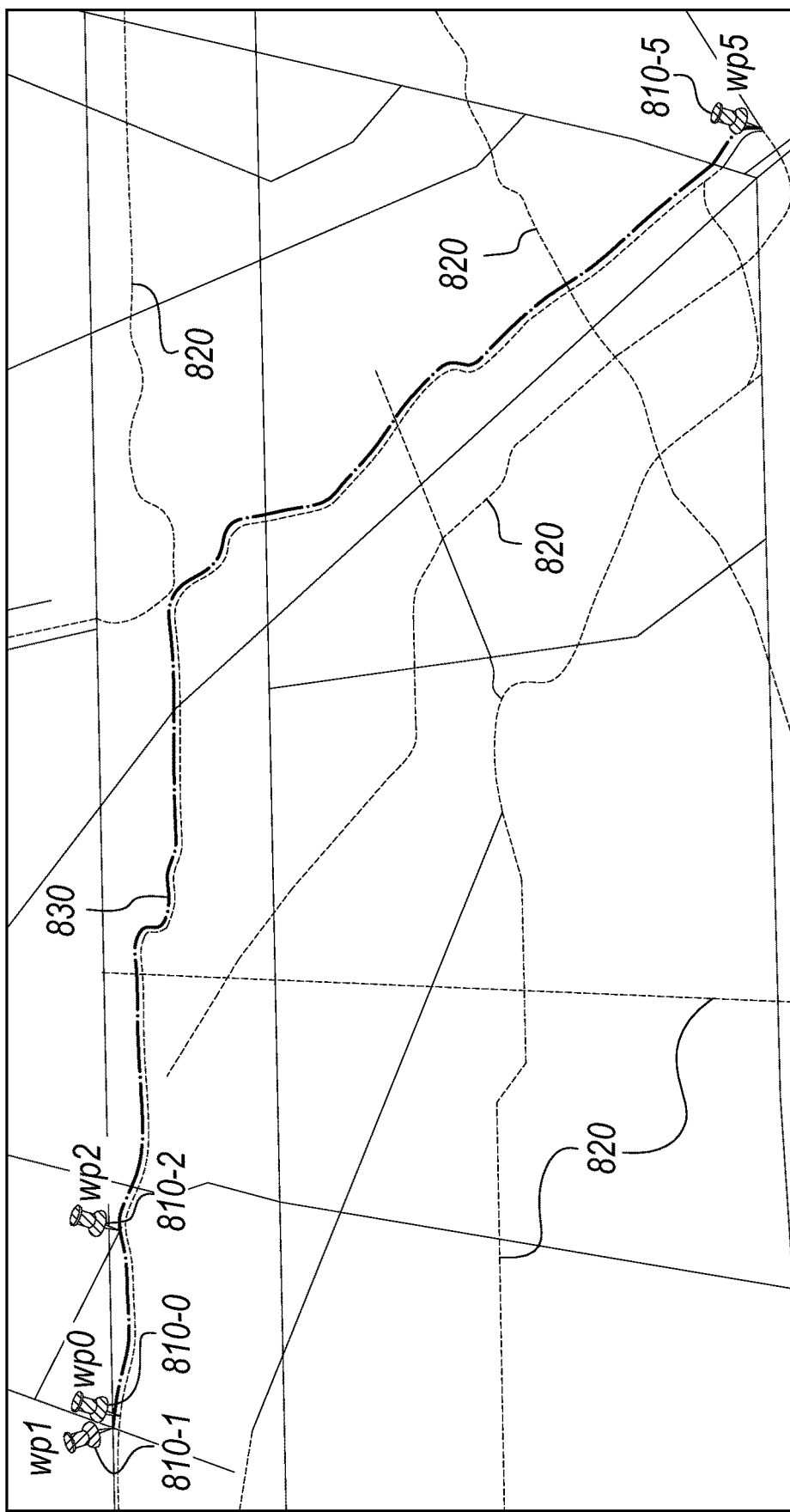
FIGS. 8A and 8B depict a changed route based on additional waypoints.

FIG. 8A depicts a grid with SD waypoints 810-0 to 810-5 defining a route. An HD grid 820 is overlaid with the SD waypoints, and a route 830 from 810-0 to 810-5 is generated.

Figure 8B:
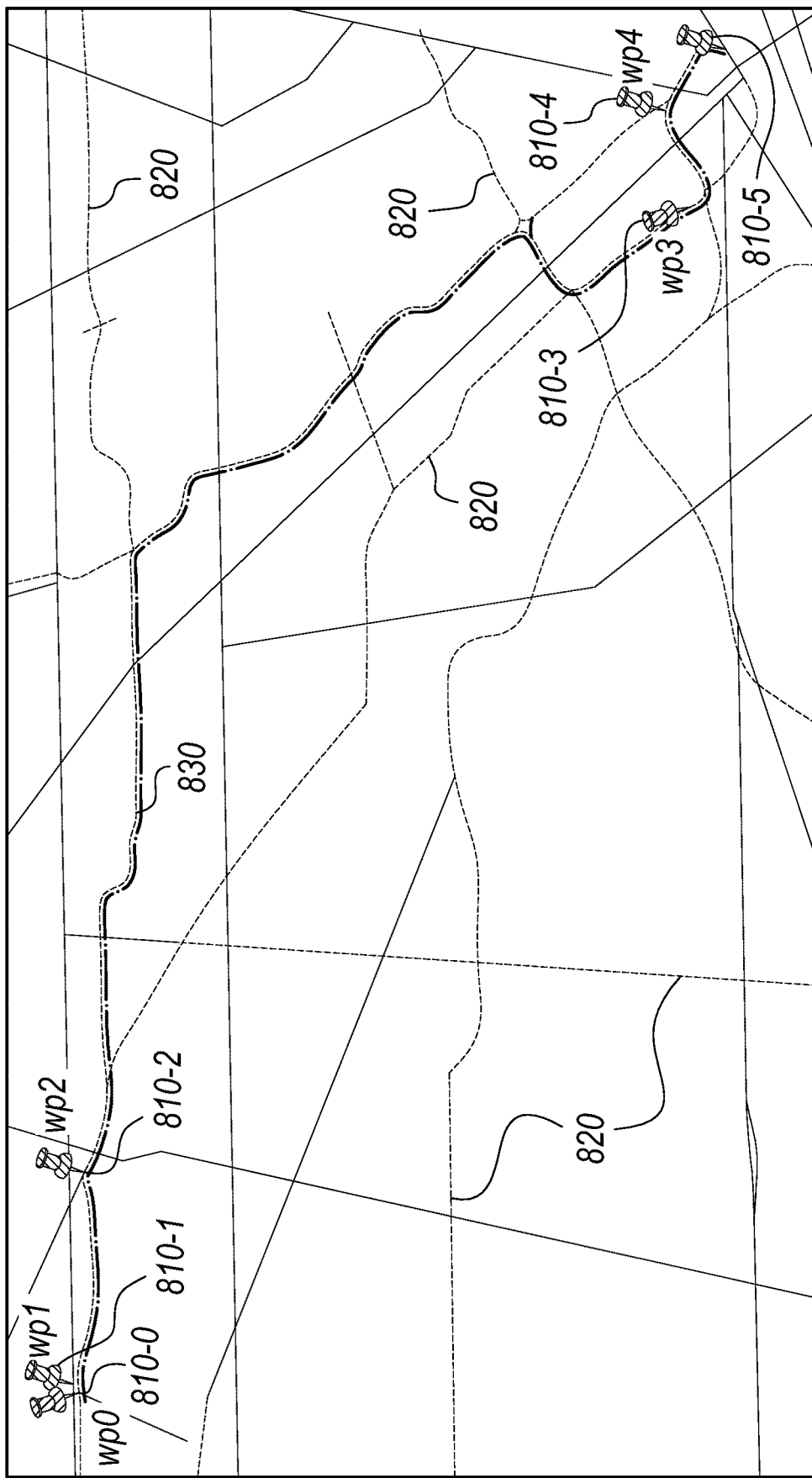

FIG. 8B depicts the same area that FIG. 8A covers, except that two additional SD waypoints 810-3 and 810-4 are shown. The addition of these waypoints changes portions of the grid 820 corresponding to the waypoints, and so alters the route 830' that ultimately gets generated.

Figure 9A:
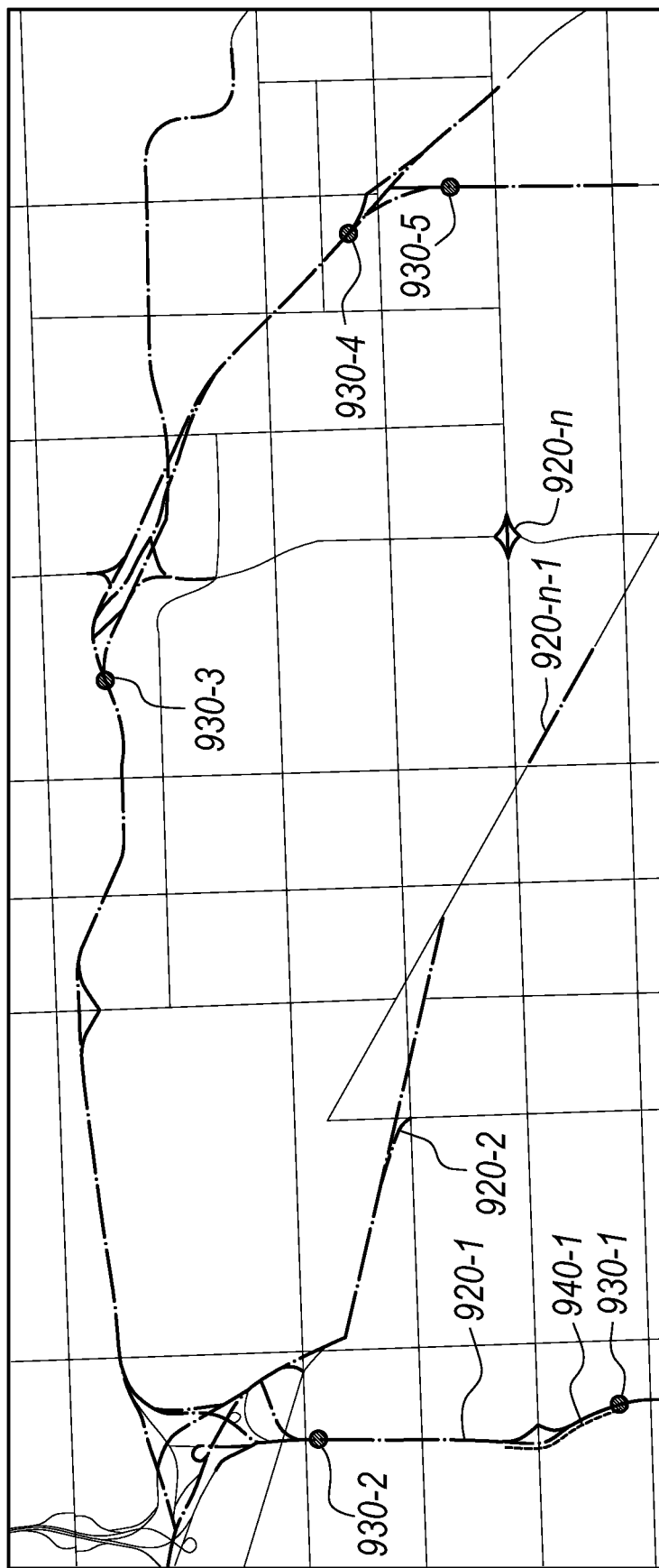
FIGS. 9A-9P illustrate development of a route based on alignment of waypoints and nodes.
Figure 9B:
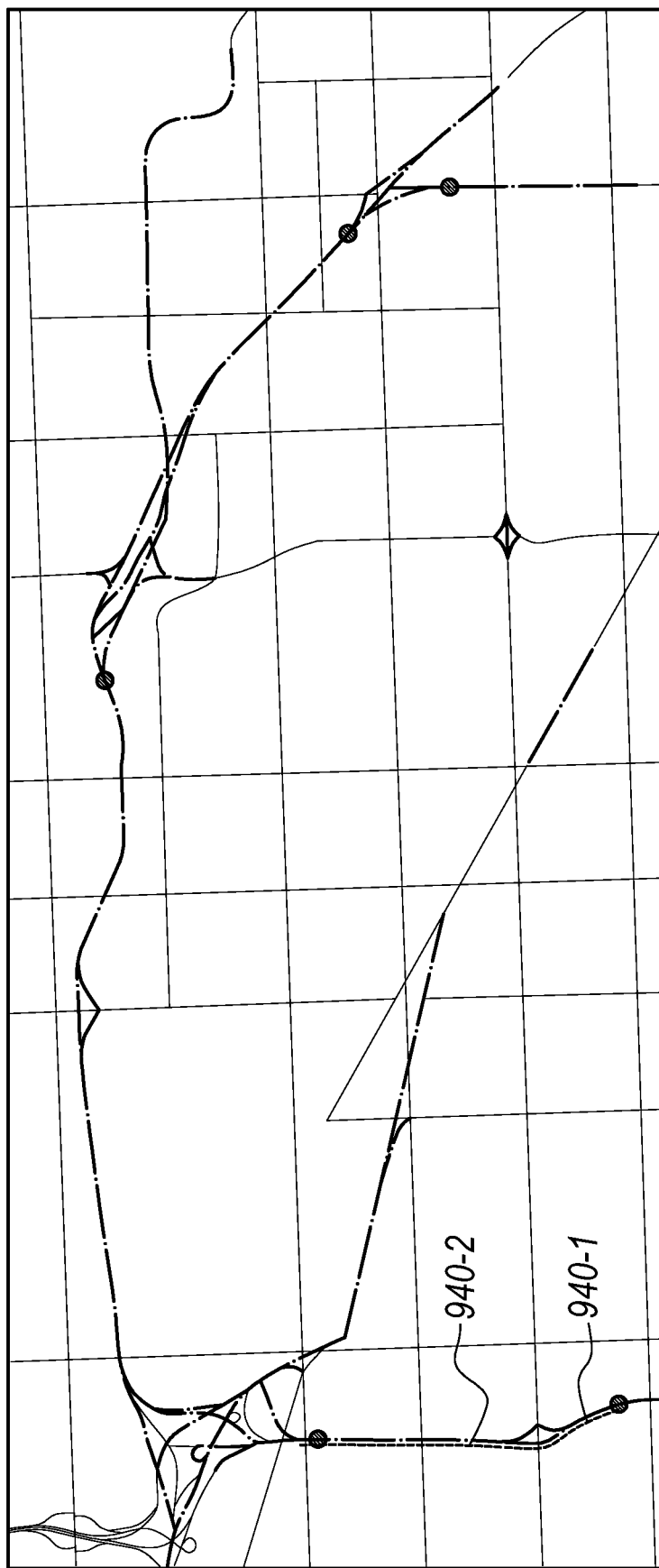
Figure 9C:
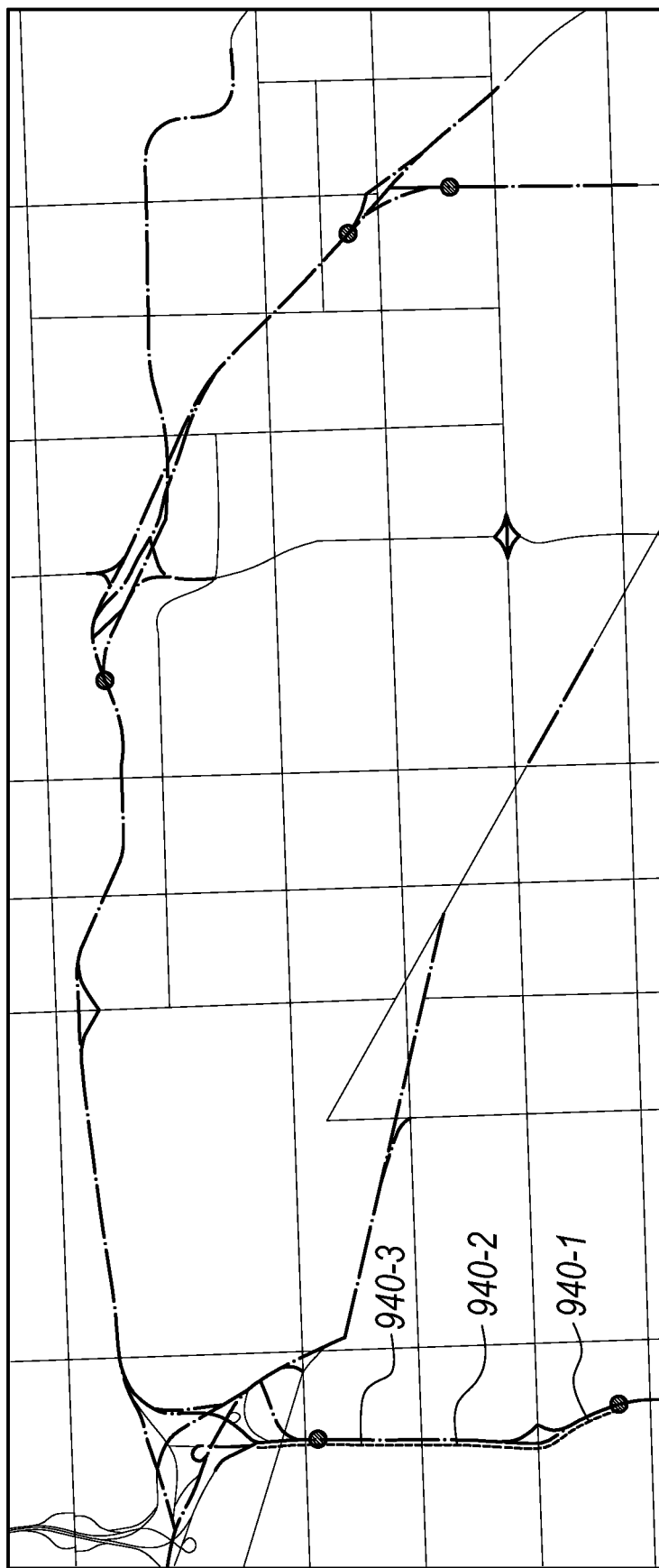
Figure 9D:
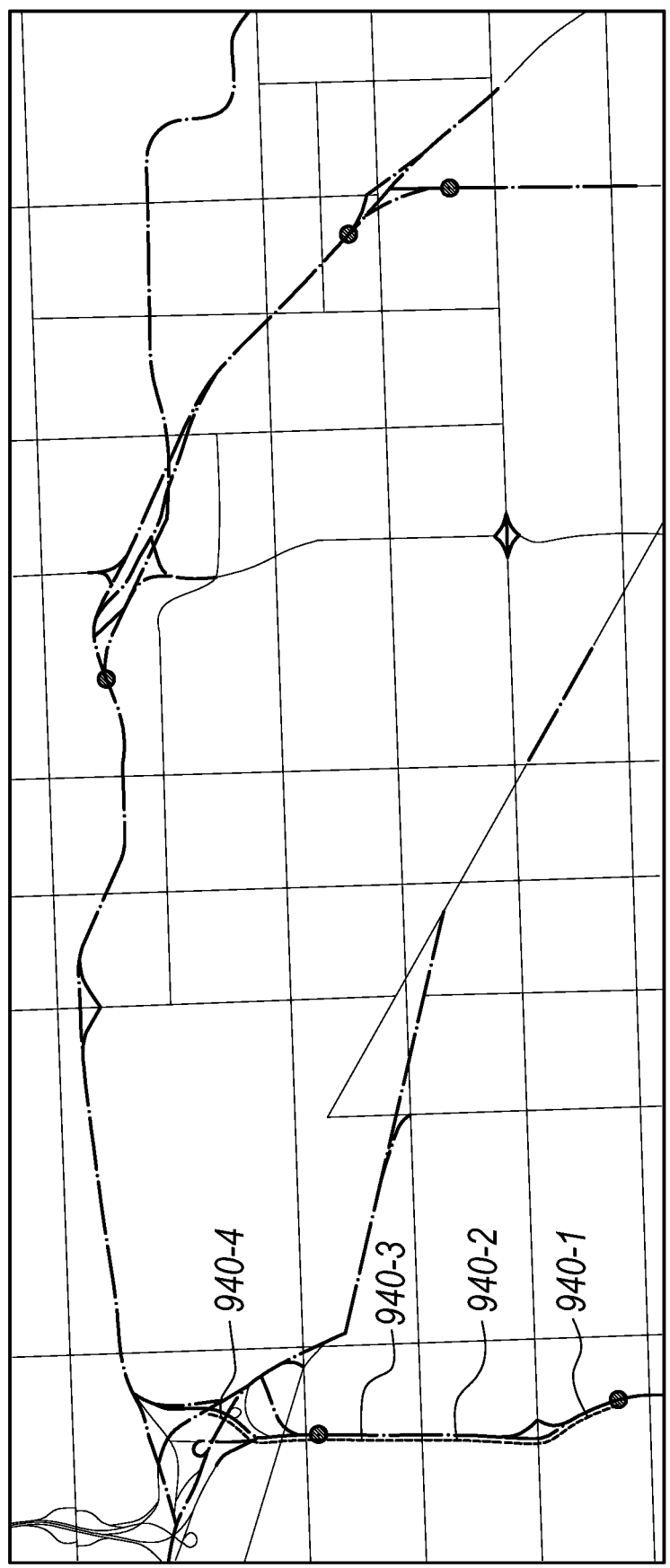
Figure 9E:
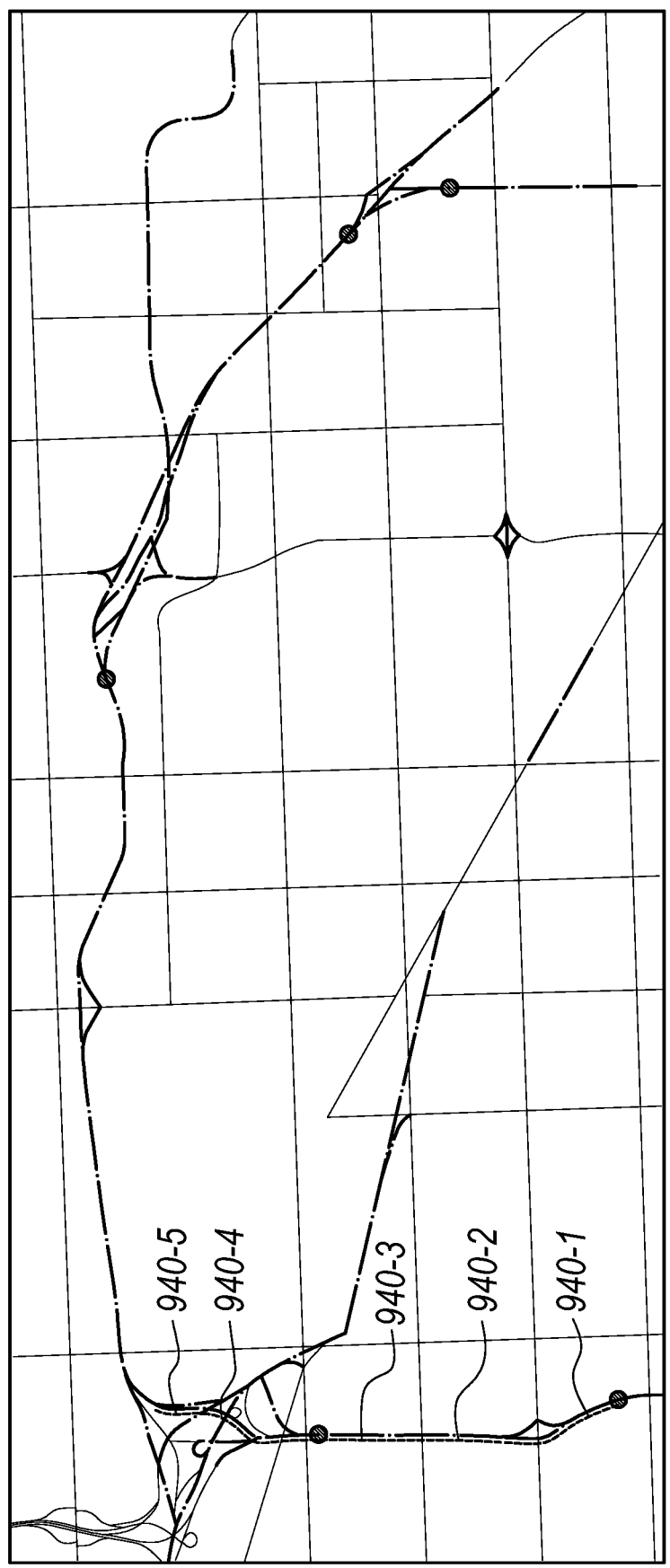
Figure 9F:
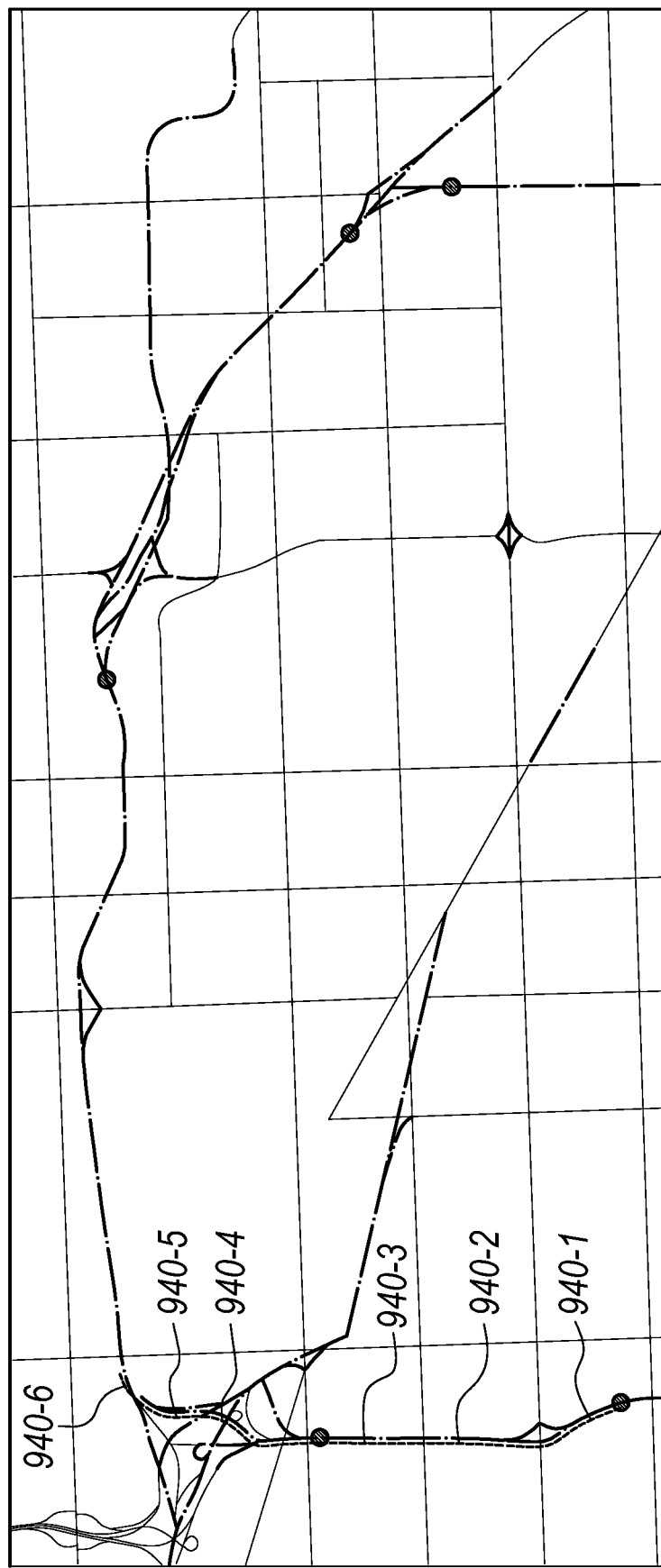
Figure 9G:
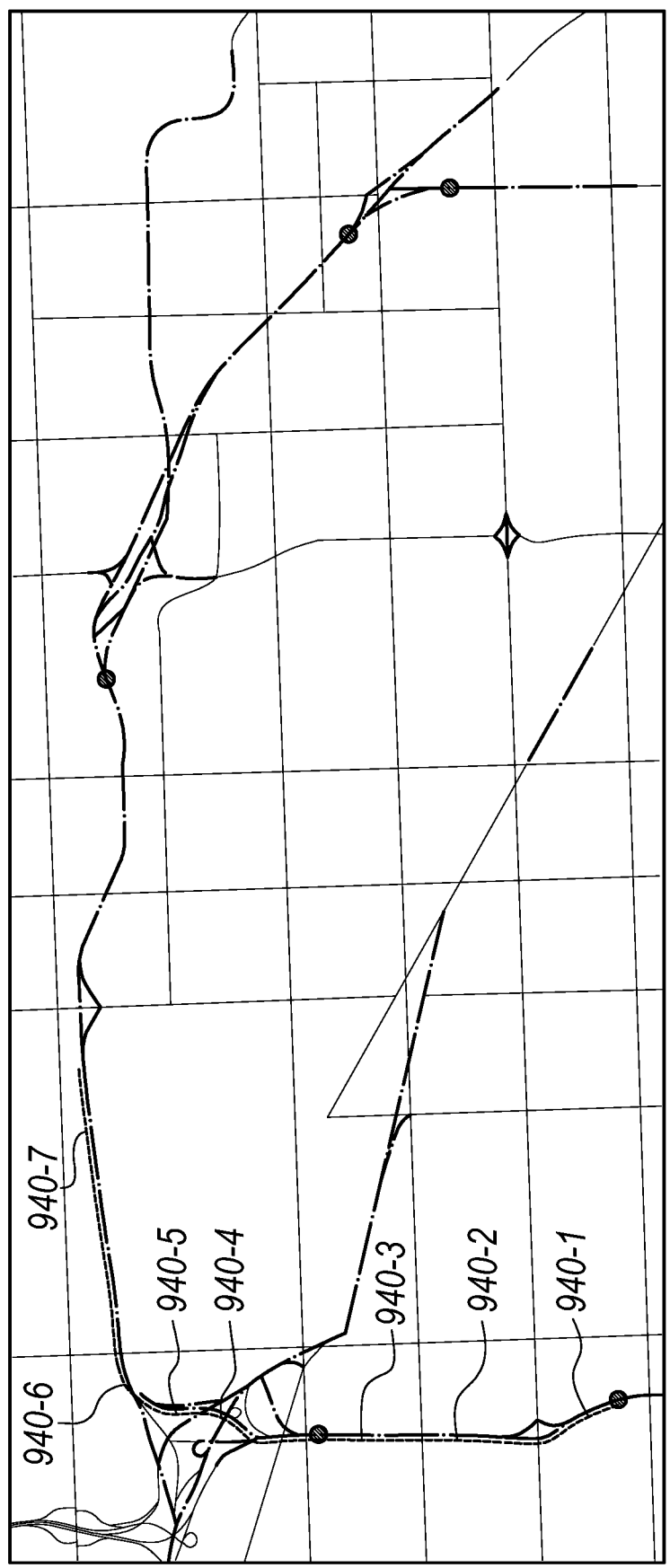
Figure 9H:
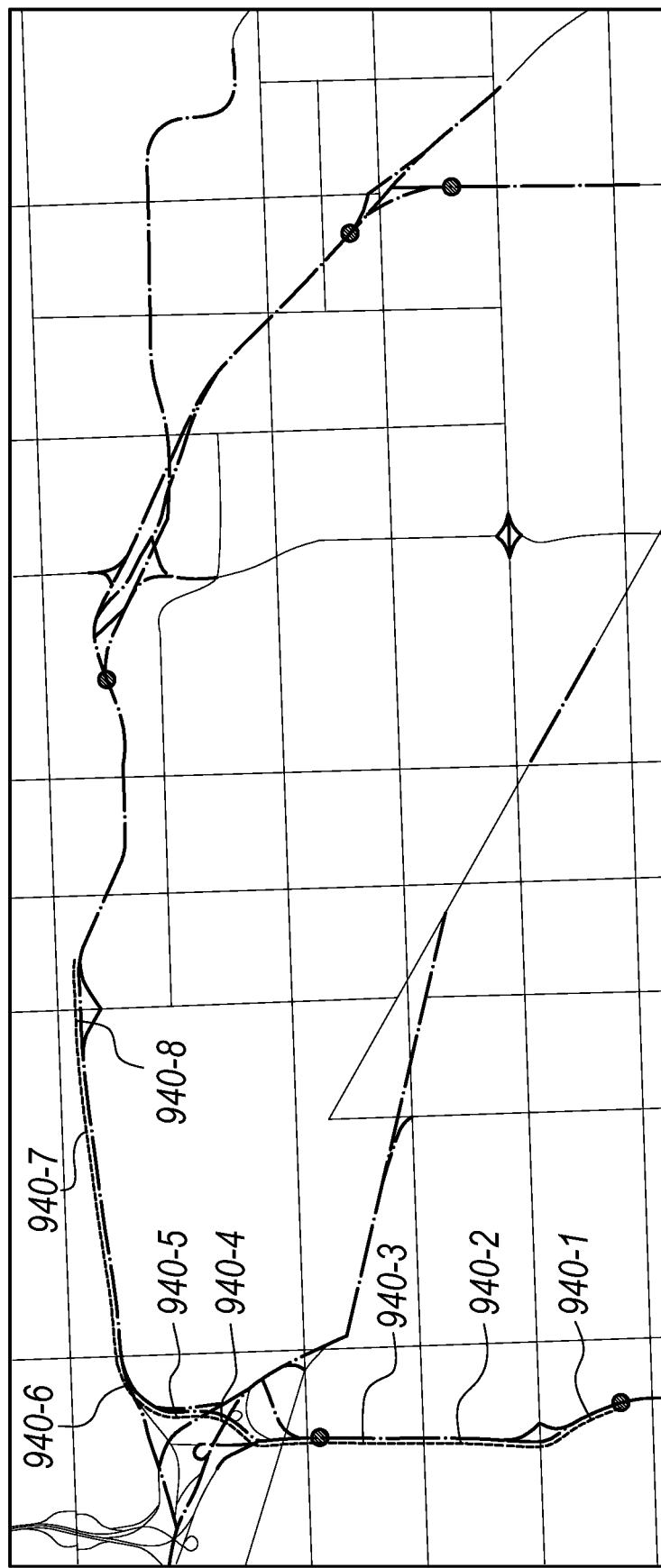
Figure 9I:
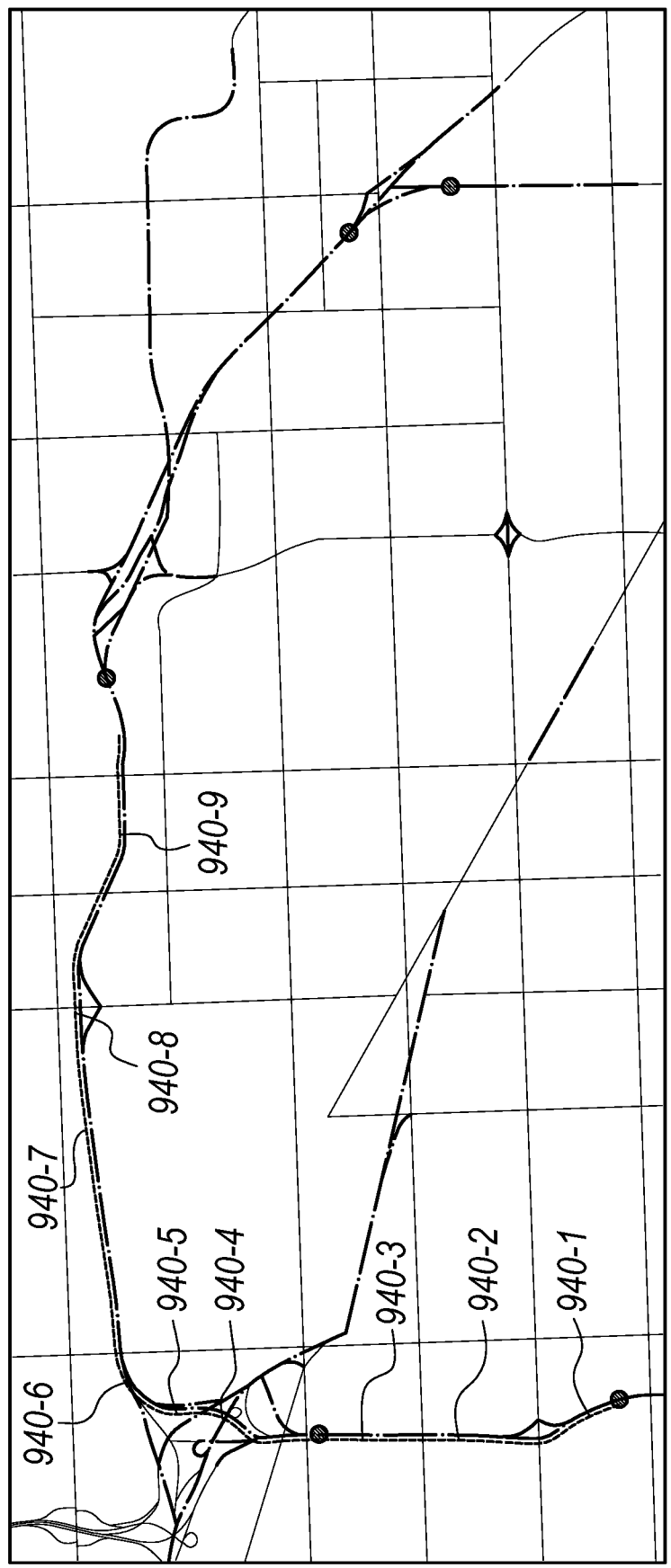
Figure 9J:
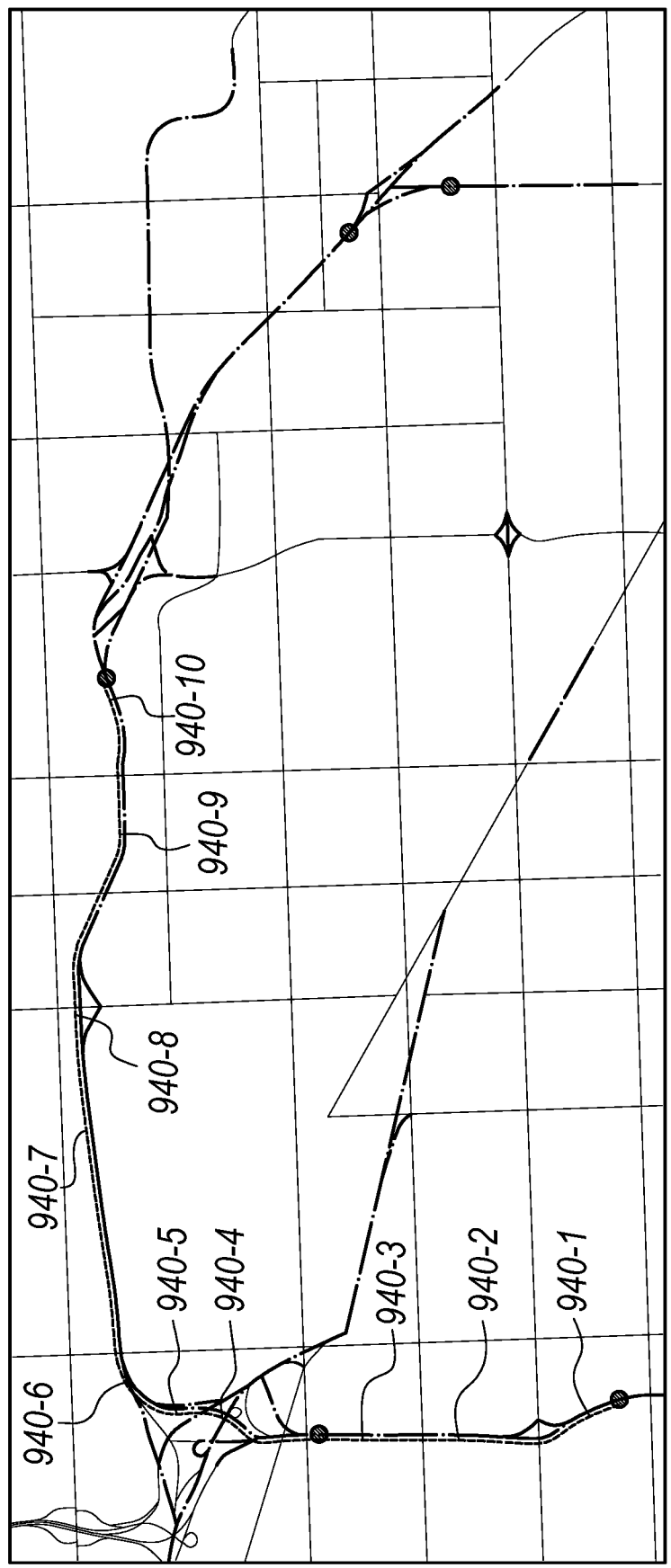
Figure 9K:
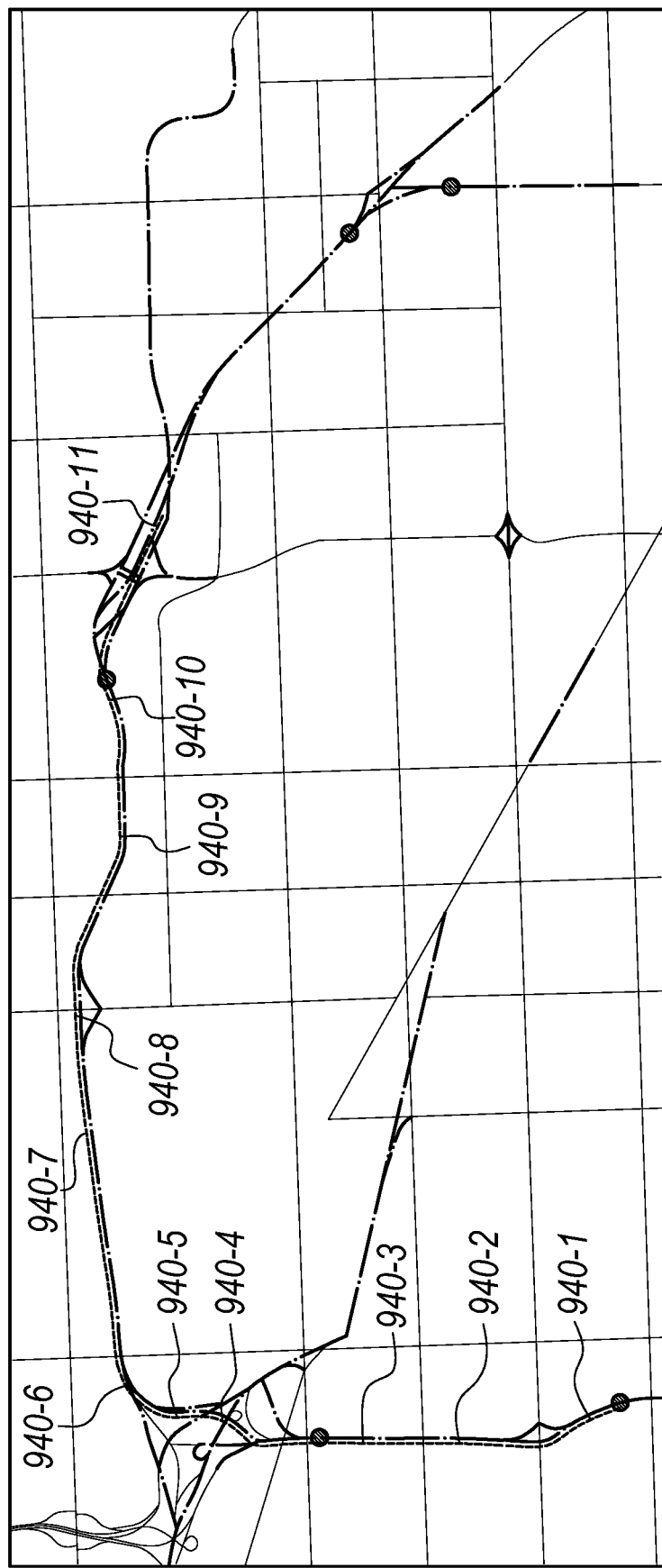
Figure 9L:
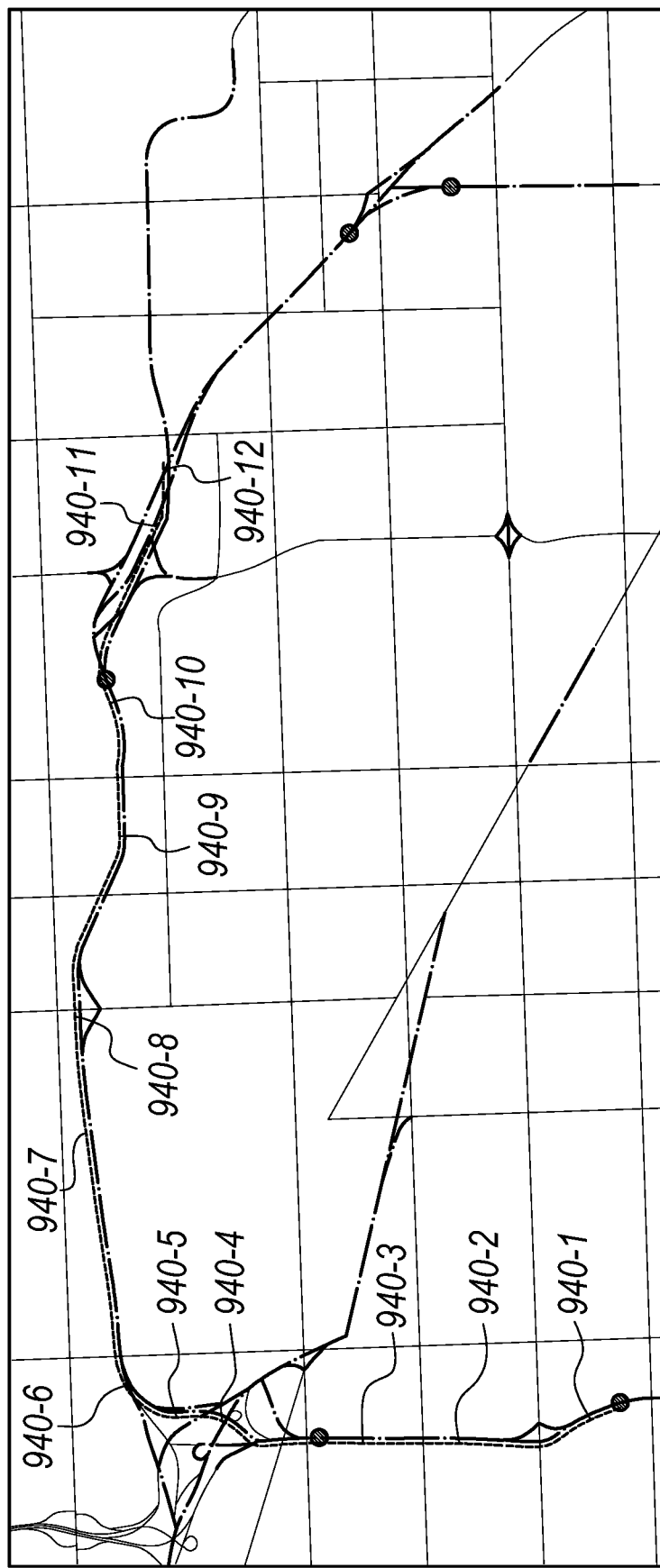
Figure 9M:
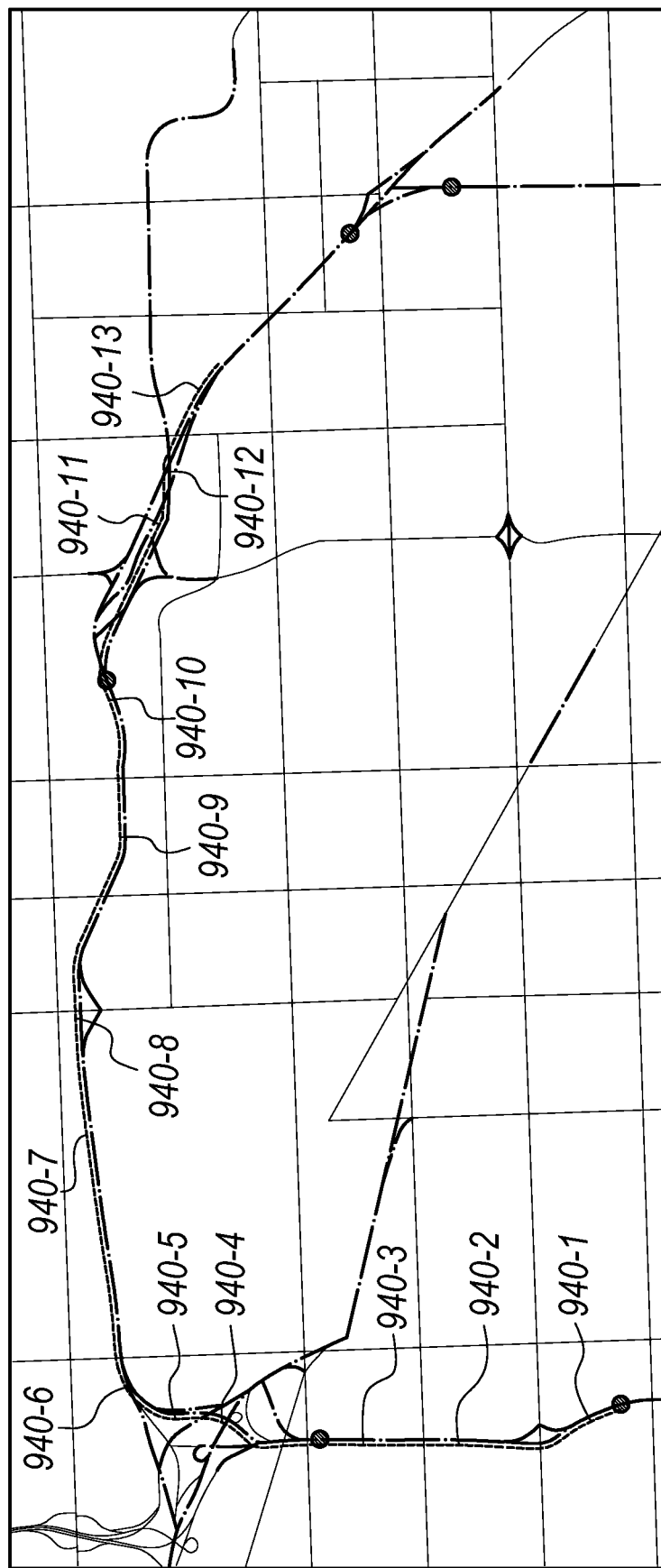
Figure 9N:
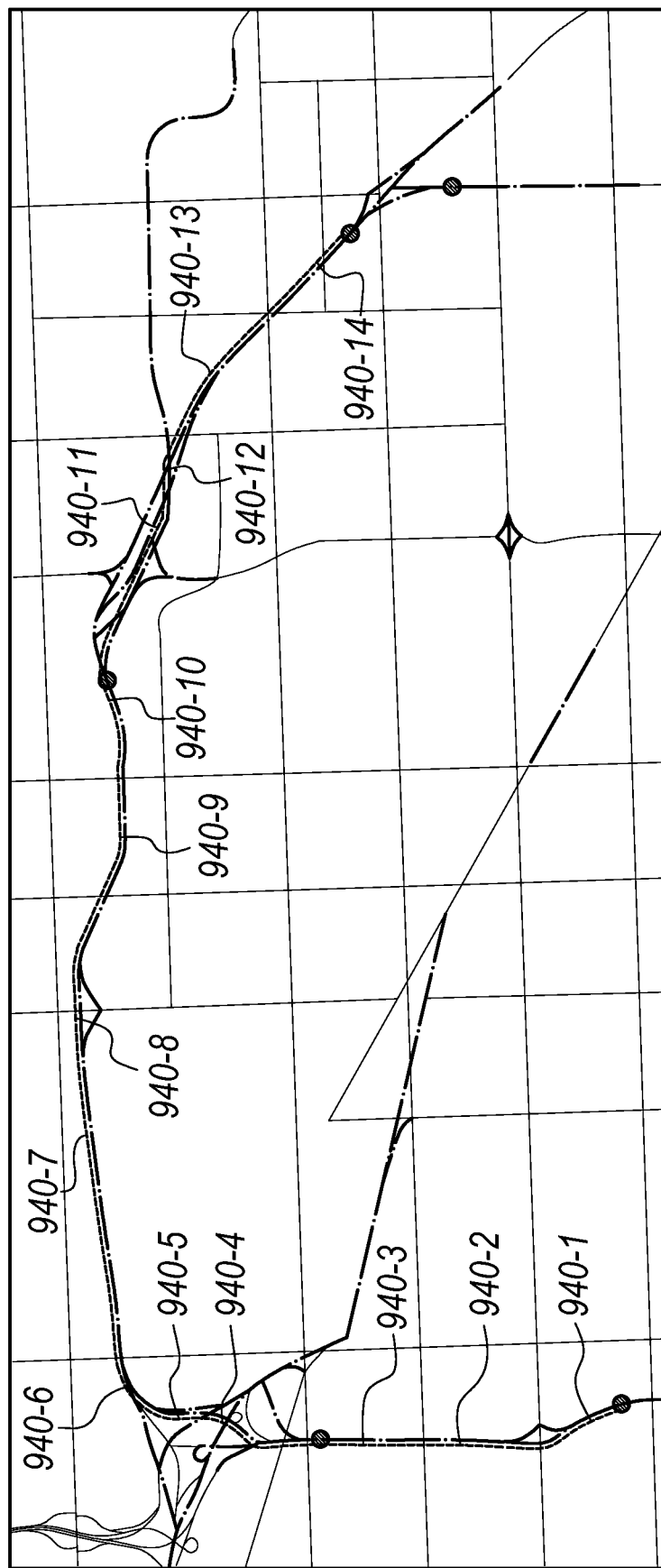
Figure 9O:
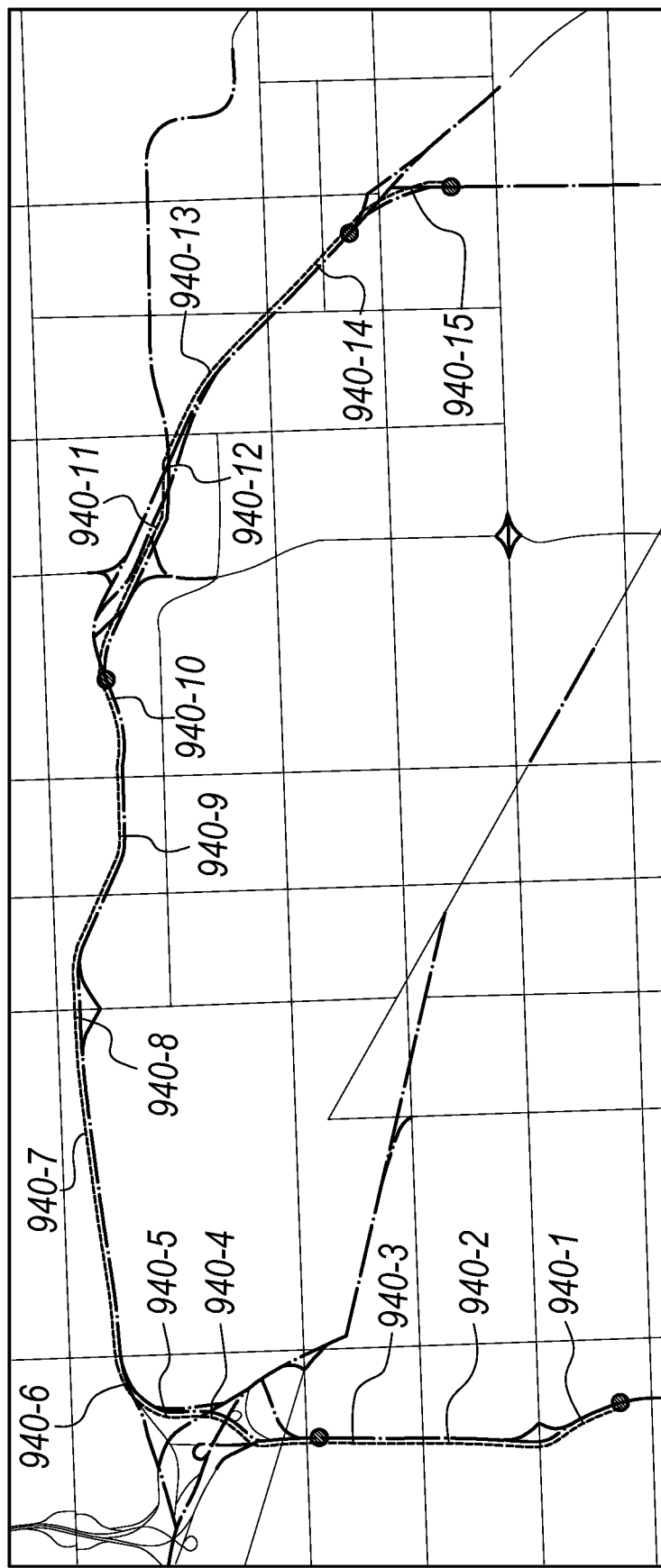
Figure 9P:
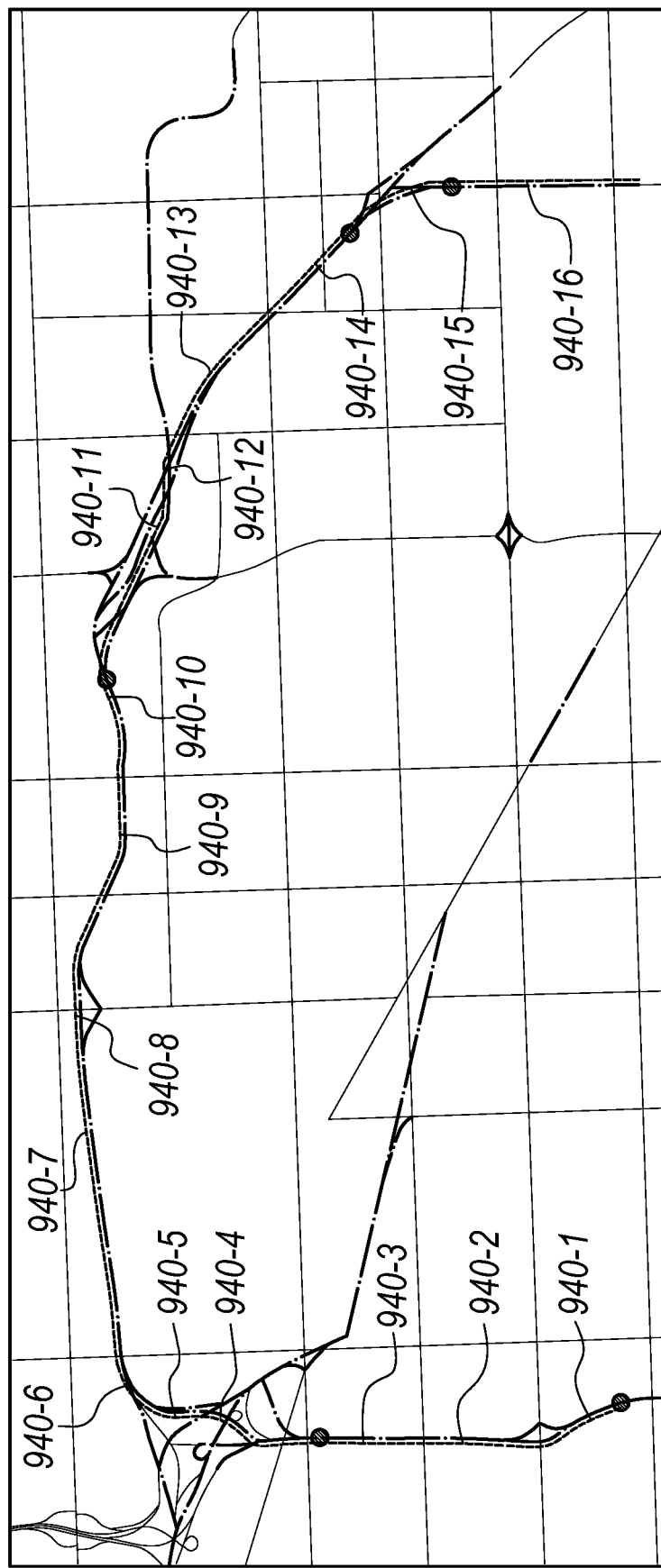

FIGS. 9A-9P depict the above-mentioned incremental spatial join between SD waypoints and HD nodes. Each of these Figures, in sequence, shows an additional line that is plotted based on the spatial network developed between the SD waypoints and the HD nodes. In FIG. 9A, an HD graph comprising elements 920-1, 920-1, . . . , 920-n–1, 920-n cover an area of a planned route. HD nodes 930-1 to 930-5 lie along various ones of those elements. Segment 940-1 is a first segment along a route to be defined. Successive ones of FIGS. 9B-9P add segments 940-2, 940-3, . . . , 940-16 to complete the route. Depending on the number of waypoints and the type of route, more or fewer segments may be necessary to cover the whole route.

Figure 10:
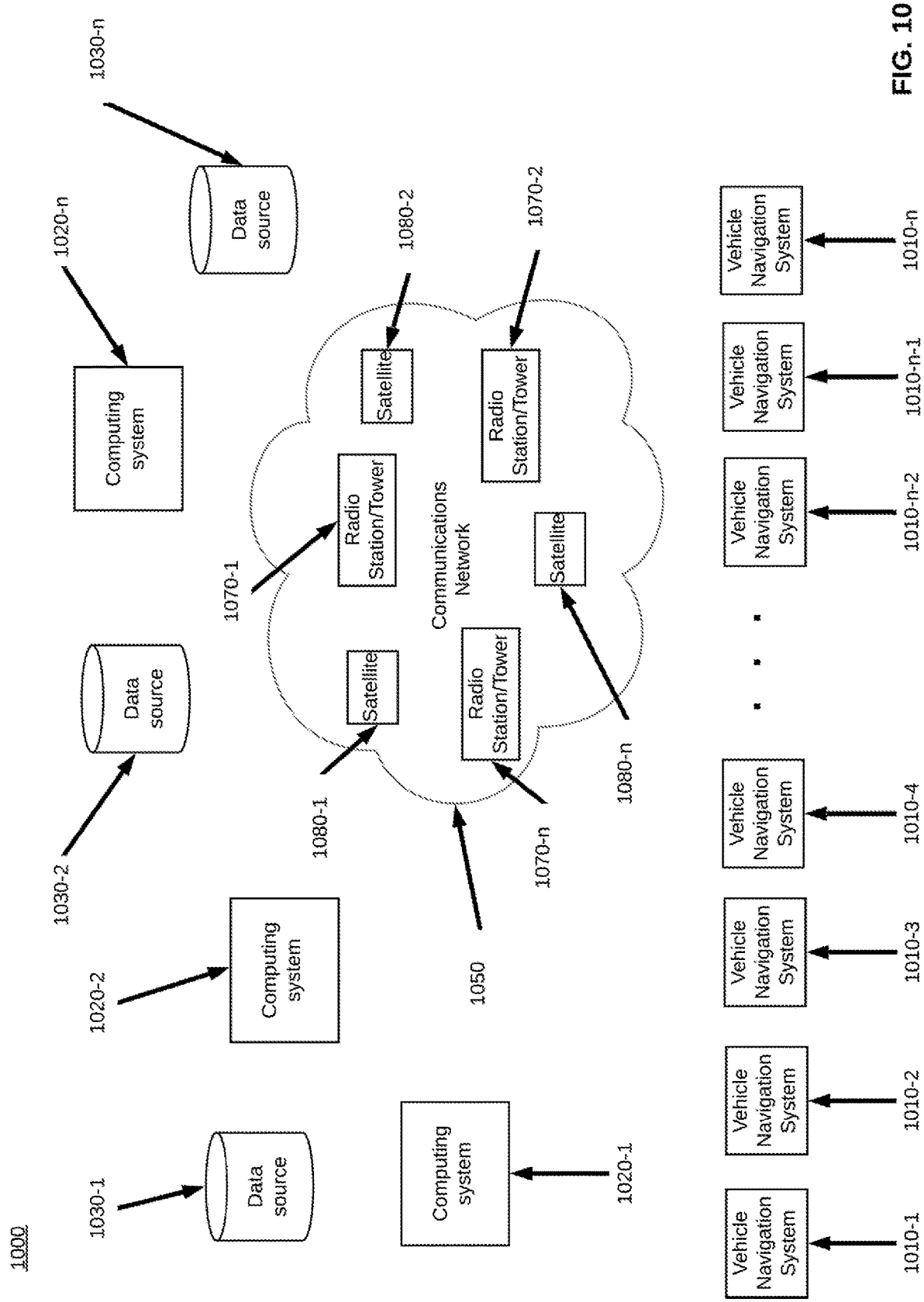
FIG. 10 is a high level block diagram of aspects of a system that implements the method.

FIG. 10 shows a system for implementing aspects of the disclosed invention. In FIG. 10, a plurality of vehicle navigation systems 1010-1 to 1010-n define routes from input destinations using SD maps. SD waypoints along the routes define the routes. In one aspect, these vehicle navigation systems also have HD maps which may be from a different source from the SD maps, so that there is no associated correlation between those SD maps and those HD maps. In that circumstance, the techniques described herein may be used to generate HD route segments.

One or more of the vehicle navigation systems 1010-1 1010-n may operate solely as a stand-alone system, either by design or because of inadequate or nonexistent communication with outside data sources. FIG. 10 shows a number of these data sources, as computing systems 1020-1 to 1020-n and data sources 1030-1 to 1030-n. The computing systems and data sources may be separate, or one or more computing systems may be connected to or otherwise associated with one or more of the data sources. These computing systems and data sources may have access to or contain updated information about traffic, road conditions, or other circumstances potentially affecting a route, as discussed earlier.

In one aspect, any of the vehicle navigation systems 1010-1 to 1020-n may communicate with any of the computing systems 1020-1 to 1020-n and/or any of the data sources 1030-1 to 1030-n via communications network 1050 to receive the just-mentioned updated information. Communications network 1050 may comprise any number of suitable equipment. In one aspect, one or more cellular or radio towers 1070-1 to 1070-n may communicate with one or more of the vehicle navigation systems. Similarly, there may be one or more satellites 1080-1 to 1080-n which can communicate with one or more of the vehicle navigation systems.

Responsive to the updated information, one or more of the vehicle navigation systems 1010-1 to 1010-n may generate one or more changed routes which become available for selection. Congestion, closure, or climatic conditions may point to altering the route, for example, onto surface streets and away from highways, or onto different highways, or onto different surface streets, or onto highways and away from surface streets. There is the option of selecting one of the changed routes, or retaining the original route.

In one aspect, depending on the start point and the end point, and on number of points of ingress and egress points along a given route, the number of segments that are necessary to lay out the whole route can vary. The ingress and egress points themselves provide one aspect of this. For example, on tollways and/or highways, including (in the United States) interstate highways, there will be a relatively small number of ingress points and egress points, compared to an urban route on surface streets. On SD maps, points of bifurcation or merging (exits on freeways, turns on surface streets) will define location of waypoints. On surface streets, the number of different possible routes may signify a need for additional waypoints, and therefore possibly for additional nodes, thus complicating the alignment problem.

Fewer ingress points and egress points may point to the need for fewer, longer segments to lay out the whole route. In such a situation, if a start point and an end point are close to tollways or highways, there may be fewer required segments. Express lanes on highways (with the possible exception of high occupancy vehicle (HOV) lanes) may have fewer exits than regular highway lanes. If an intended route bypasses certain exits, fewer segments may be required.

Ordinarily skilled artisans can appreciate that urban settings provide many more routing options, looking just at the grid of streets that may lie between a start point and an end point. In such circumstances, additional information such as time of day, traffic, traffic light patterns, and the like can reduce the number of options, and thus simplify the incremental spatial join, without requiring a prohibitively large number of segments. However, as FIGS. 8A and 8B illustrate, changing or adding SD waypoints to a route can change the overall spatial join anywhere from a little to a lot. Even though the above-mentioned additional information can help to reduce the number of optional routes, all of the intersections still present opportunities for vehicle operators to turn. According to embodiments, it would be desirable to provide a waypoint and/or a node at or near each such intersection, to keep a vehicle on a desired route. More waypoints and nodes can mean a larger number of segments. In FIGS. 9A-9P, the number of segments can be smaller and the route more simplified because the route is along a highway. If a route were taken along surface streets, as a routing algorithm (such as Waze) might suggest when freeway traffic is particularly heavy, the resulting greater complexity is apparent.

According to aspects of the techniques described herein, input may come from a diverse set of modalities. Some of these, such as TMC location sequences and route bifurcation and merging points, have been discussed previously. Another such set of modalities might come from Open Location Reference (OLR) paths, according to OpenLR, an open standard for encoding, transmitting and decoding location references in digital maps which TomTom developed, and which likewise is known to ordinarily skilled artisans.

All of the modalities listed here are exemplary, and are intended to inform ordinarily skilled artisans of the types of information on which the techniques described herein may rely.

According to some aspects, the techniques described herein can be operated in real-time or in an offline manner, as noted earlier. Real-time operation may entail communication with a central source of information, for example, relating to the modalities just discussed. Offline operation may be required where communications are choppy or non-existent, or in some circumstances, may be possible or even desired where conditions that otherwise might affect traffic or routing are relatively benign, or are expected to have little to no effect on ultimate routing.

While the foregoing describes one or more embodiments in accordance with aspects of the disclosed invention, various modifications will be apparent to ordinarily skilled artisans. Consequently, only the following claims limit the invention's scope.

What is claimed is:

1. A map alignment method in an autonomous driving system, the method comprising:
   responsive to an input of one or more destinations, defining at least one route using waypoints from a standard definition (SD) map containing data for routes;
   generating a graph, comprising nodes and edges, from a high definition (HD) map containing data to enable the autonomous driving system to monitor vehicle orientation in real time and to correct the orientation in real time, the graph related to at least part of the at least one route;
   identifying the nodes and the edges that follow the at least one route;
   converting the waypoints to the nodes using the graph; and
   generating route segments from the defined at least one route, the generated graph, the identified nodes, the identified edges, and the converted waypoints.

2. The method of claim 1, wherein each of the route segments comprises one or more edges, the edges connecting the nodes to define the at least one route.

3. The method of claim 1, wherein defining the at least one route comprises defining a plurality of routes, the method further comprising generating the route segments in response to selection of one of the plurality of routes as a selected route.

4. The method of claim 1, wherein, responsive to one or more changes in conditions, the at least one route changes to a changed route, the method further comprising repeating the generating the graph, identifying the nodes and the edges, converting the waypoints to the nodes, and generating the route segments in response to the changed route.

5. The method of claim 3, wherein, responsive to one or more changes in conditions, the defining further comprises defining a plurality of changed routes, the method further comprising performing the generating the graph, identifying the nodes and edges, converting the waypoints to the nodes, and generating the route segments in response to selection of one of the plurality of changed routes or retention of the selected route.

6. A map alignment system in an autonomous driving system, the map alignment system comprising:
   a standard definition (SD) map containing data for routes;
   a high definition (HD) map containing data to enable the autonomous driving system to monitor vehicle orientation in real time and to correct the orientation in real time;
   computing equipment configured to:
   define at least one route using waypoints from the SD map in response to an input of one or more destinations;
   generate a graph, comprising nodes and edges, from the HD map, the graph related to the at least one route;
   identify nodes and edges that follow the at least one route;
   convert the waypoints to the nodes using the graph; and
   generate route segments from the defined at least one route, the generated graph, the identified nodes, the identified edges, and the converted waypoints.

7. The map alignment system of claim 6, wherein each of the route segments comprises one or more edges, the route segments connecting the nodes to define the at least one route.

8. The map alignment system of claim 6, wherein the computing equipment is configured to define a plurality of routes, and to generate route segments in response to selection of one of the plurality of routes as a selected route.

9. The map alignment system of claim 8, further comprising at least one data source external to the SD map and the HD map, the computing equipment responsive to contents of the at least one data source to define a plurality of changed routes, the computing equipment further configured to generate the route segments in response to one of selection of one of the plurality of changed routes or retention of the selected route.

10. The map alignment system of claim 6, further comprising at least one data source external to the SD map and the HD map, the computing equipment responsive to contents of the at least one data source to change the at least one route to a changed route, the computing equipment further configured to generate the route segments in response to the changed route.

11. A vehicle navigation system in an autonomous vehicle driving system, the vehicle navigation system comprising a map alignment system, wherein the map alignment system comprises:
   a standard definition (SD) map containing data for routes;
   a high definition (HO) map containing data to enable the autonomous driving system to monitor vehicle orientation in real time and to correct the orientation in real time;
   computing equipment configured to:
   define at least one route using waypoints from the SD map in response to an input of one or more destinations;
   generate a graph, comprising nodes and edges, from the HD map, the graph related to the at least one route;
   identify nodes and edges that follow the at least one route;
   convert the waypoints to the nodes using the graph; and
   generate route segments from the defined at least one route, the generated graph the identified nodes, the identified edges, and the converted waypoints.

\* \* \* \* \*